US005946866A

United States Patent [19]
Weglewski et al.

[11] Patent Number: 5,946,866
[45] Date of Patent: Sep. 7, 1999

[54] MODULAR DAMPER

[75] Inventors: James T. Weglewski, Inver Grove Heights; Ming-Lai Lai, Lake Elmo, both of Minn.

[73] Assignee: Minnesota Mining and Manufacturing Company, St. Paul, Minn.

[21] Appl. No.: 08/893,120

[22] Filed: Jul. 15, 1997

Related U.S. Application Data

[63] Continuation of application No. 08/779,724, Jan. 6, 1997, which is a continuation of application No. 08/505,700, Jul. 21, 1995.

[51] Int. Cl.⁶ .............................. E02D 27/34; E04B 1/98; E04H 9/02
[52] U.S. Cl. ...................... 52/167.1; 52/167.7; 52/167.8; 52/167.9
[58] Field of Search .............................. 52/167.1, 167.8, 52/167.7, 167.9

[56] References Cited

U.S. PATENT DOCUMENTS

| | | | |
|---|---|---|---|
| 3,605,953 | 9/1971 | Caldwell et al. ........................ | 188/1 |
| 4,117,637 | 10/1978 | Robinson ................................. | 52/167 |
| 4,121,393 | 10/1978 | Renault .................................... | 52/167 |
| 4,425,980 | 1/1984 | Miles ....................................... | 181/208 |
| 4,761,925 | 8/1988 | Fukahori et al. ........................ | 52/167 |
| 4,823,522 | 4/1989 | White ....................................... | 52/167 |
| 4,899,323 | 2/1990 | Fukahari et al. .................... | 52/167.7 X |
| 4,910,929 | 3/1990 | Scholl .................................. | 52/167 R |
| 4,924,640 | 5/1990 | Suizu ....................................... | 52/167 |
| 4,942,703 | 7/1990 | Nicoloi .................................. | 52/167.7 |
| 5,161,338 | 11/1992 | Toda ....................................... | 52/167.1 |
| 5,233,800 | 8/1993 | Sasaki et al. .......................... | 52/167.1 |
| 5,339,580 | 8/1994 | Koshiko et al. ....................... | 52/167.1 |
| 5,357,723 | 10/1994 | Sasaki et al. .......................... | 52/167.1 |
| 5,410,845 | 5/1995 | Sakamoto et al. ................. | 52/167.1 X |
| 5,461,835 | 10/1995 | Tarics ................................. | 52/167.7 X |
| 5,474,840 | 12/1995 | Landin ............................... | 52/167.1 X |

FOREIGN PATENT DOCUMENTS

| | | | |
|---|---|---|---|
| 59-134230 | 8/1984 | Japan ............................. | E02D 27/34 |
| 9134230 | 8/1984 | Japan .................................. | 52/167.7 |
| 158908 | 6/1994 | Japan .................................. | 52/167.1 |

OTHER PUBLICATIONS

James A. Richards, Jr. et al., *Modern University Physics,* Chapter 10, "Elastocotu." pp. 210–219, Addison–Wesley Publishing Company, Inc. (1960).

K.C. Chang et al., "Viscoelastic Dampers as Energy Dissipation Devices for Seismic Applications" in *Earthquake Spectra,* vol. 9, No. 3 (1993) pp. 371–387.

J.E. Shigley and C.R. Mischke, Chapter 8, "The Design of Screws, Fasteners, and Connections," of *Mechanical Engineering Design,* 5th Edition, published by McGraw–Hill, Inc. 1989, pp. 325–381.

3M Brochure entitled *Viscoelastic Dampers for Seismic and Wind Applications,* 3M Vibration Control, Industrial Tape and Specialties Division, Saint Paul, Minnesota, 1995 (10 pages).

*Primary Examiner*—Carl D. Friedman
*Assistant Examiner*—W. Glenn Edwards

[57] ABSTRACT

A modular damper which comprises one or more individual damper elements which are mounted into the damper structure. The dampers are useful in damping structures such as buildings, bridges, etc.

53 Claims, 12 Drawing Sheets

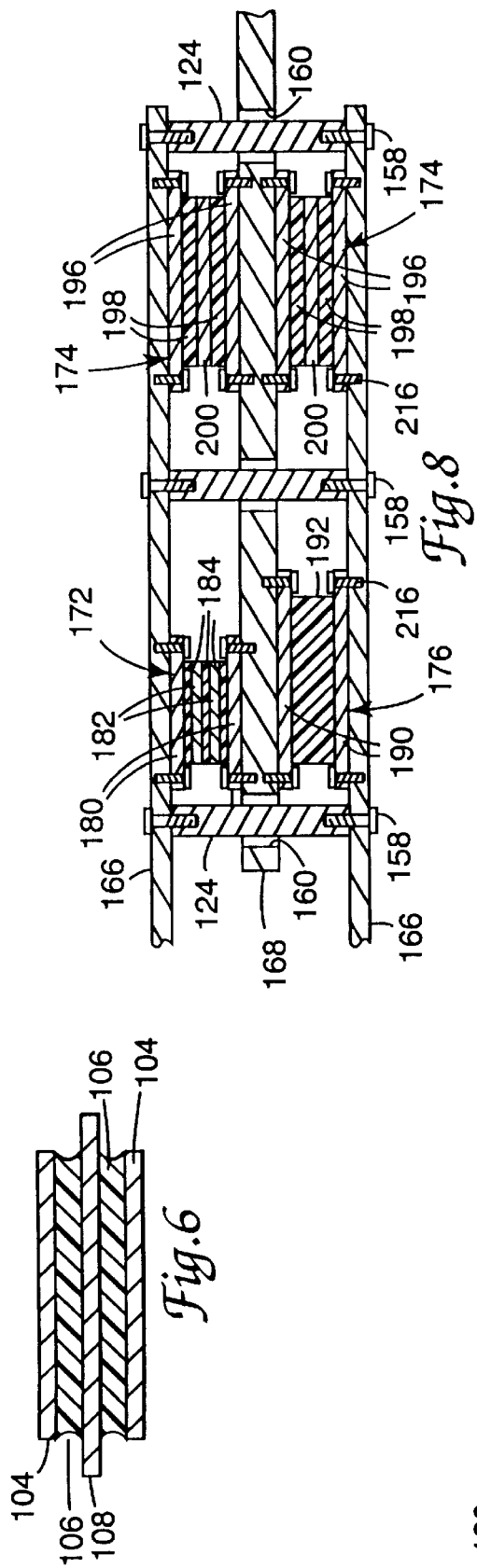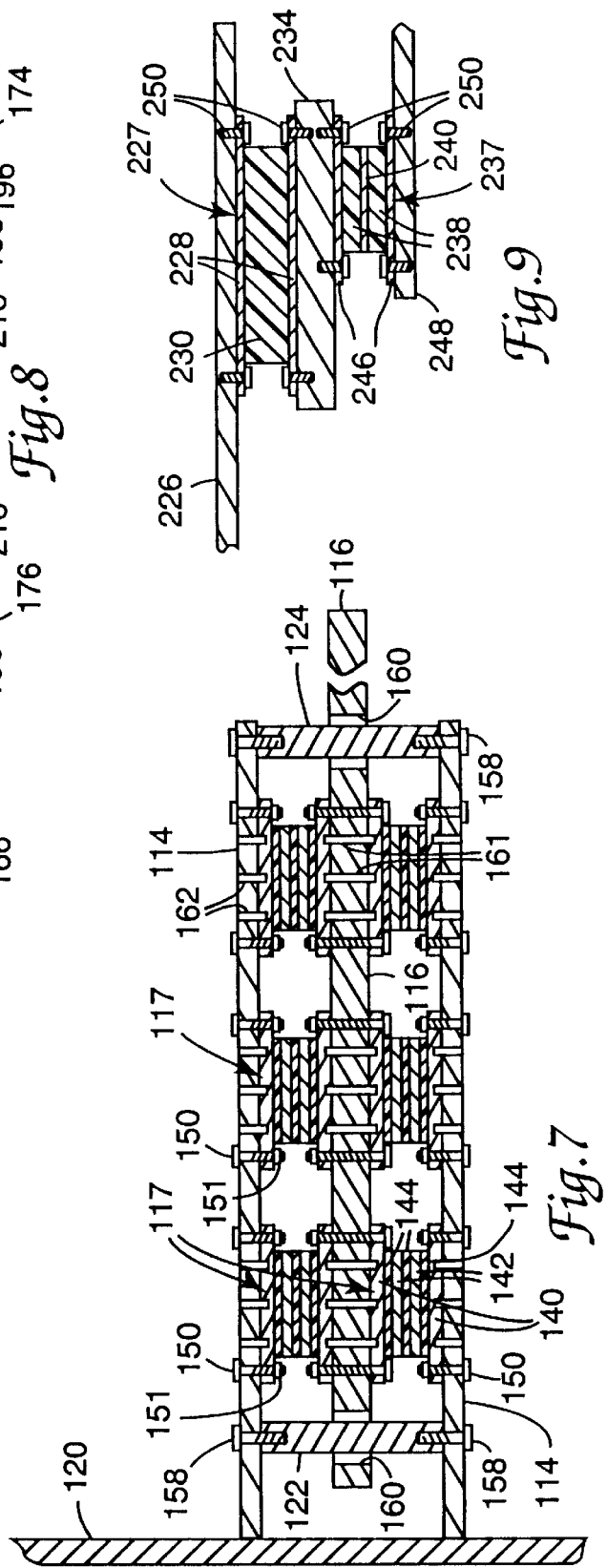

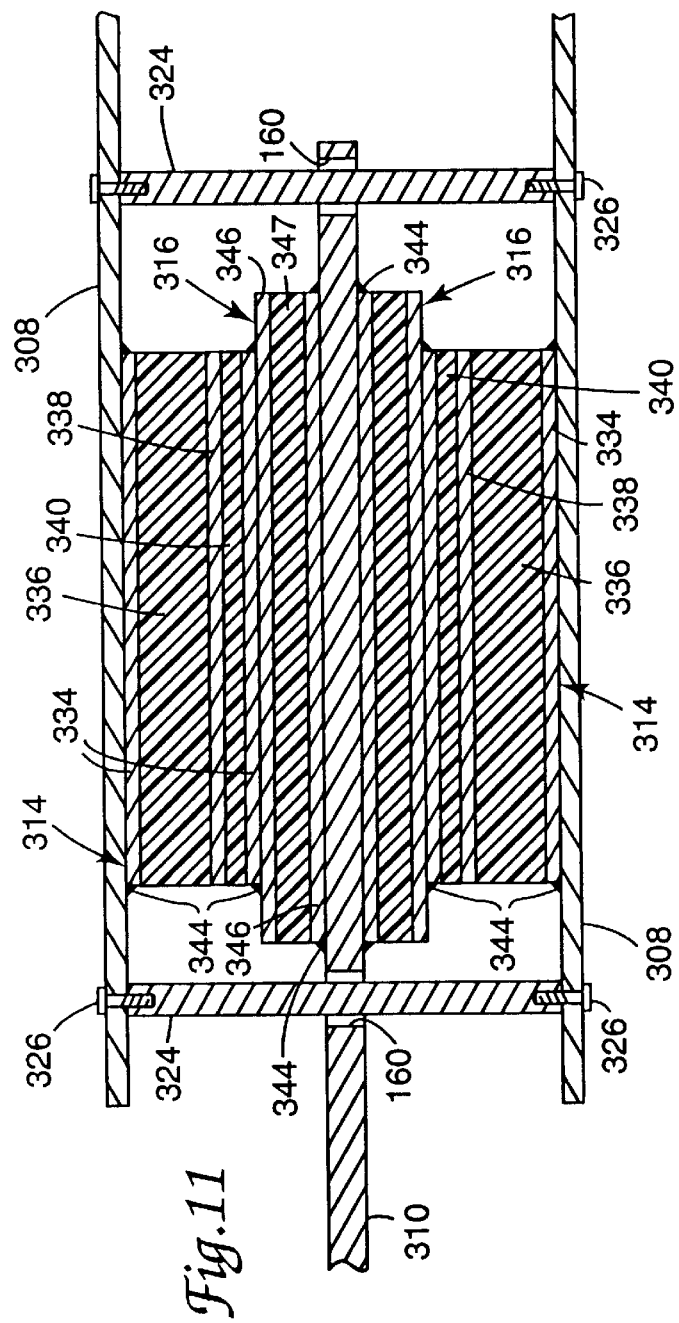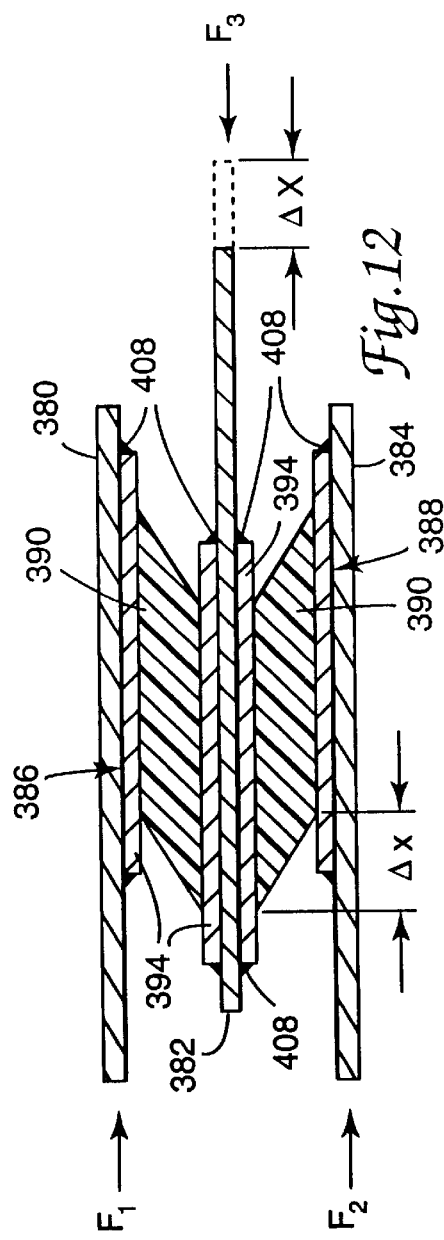

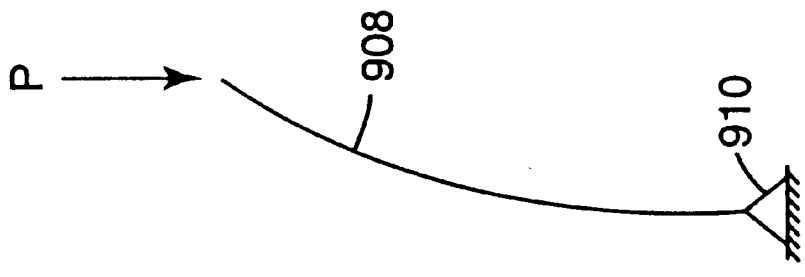
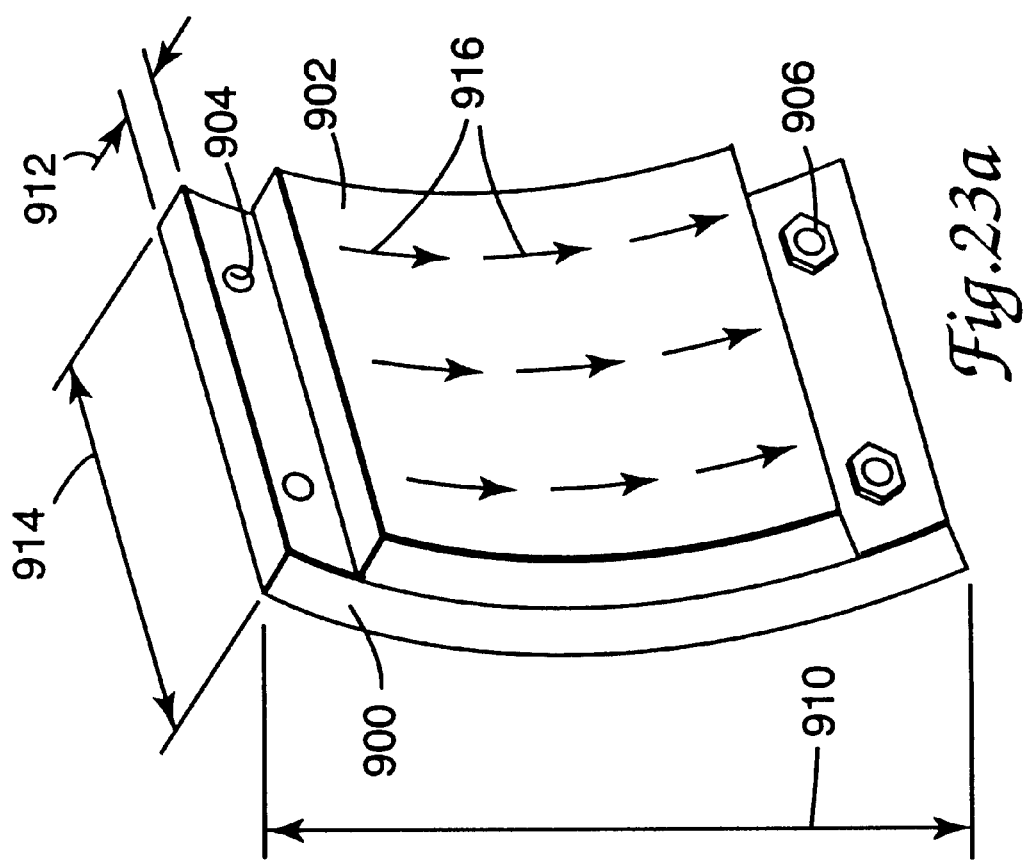

MODULAR DAMPER

This is a continuation of Application Ser. No. 08/779,724, filed Jan. 6, 1997, which is a continuation of Application Ser. No. 08/505,700 filed Jul. 21, 1995.

The present invention relates to a modular damper which comprises one or more individual damping elements which are mounted into the damper chassis. The modular dampers are useful in damping structures such as buildings, bridges, etc.

BACKGROUND OF THE INVENTION

Energy dissipating dampers are conventionally used in structures such as buildings, bridges, water towers, civil infrastructure improvement, etc., to reduce the effect of vibration due to wind, earthquakes, etc. Typically these energy dissipating dampers comprise a vibration damping material which is bonded directly to the relatively large structural members of the dampers. These dampers are then positioned in a structure such as a building in a manner to most effectively reduce the effects of vibration on the structure.

The following references describe known non-modular energy dissipating dampers that can be used in buildings, etc.

Caldwell et al., U.S. Pat. No. 3,605,953 discloses a non-modular damper having a viscoelastic layer firmly adhesively bonded to a pair of rigid members having broad surfaces. Each rigid member has a stiffness exceeding that of 0.1 inch (2.54 mm) steel. The damping unit may be mounted between a supporting column and a truss in a building structure.

Scholl, U.S. Pat. No. 4,910,929, discloses a non-modular damper having a stiff component and a flexible component with optional heat dissipation plates layered into the flexible component. The stiff component(s) is/are typically connected between the beams or columns of a building or structure to provide damping equal to or greater than 100% of the inherent damping of the building.

Fukahori et al., U.S. Pat. No. 4,761,925 discloses an anti-seismic rubber bearing made up of alternating stiff rigid plates and flexible plates with viscoelastic properties all bonded together between flanges of thick steel plate. The anti-seismic rubber bearing has flexibility or low shear modulus in the horizontal direction and is interposed between a building and a foundation.

Robinson, U.S. Pat. No. 4,117,637 discloses a cyclic shear energy absorber interposed between members of a structure to isolate it from earthquakes or movement caused by high wind. Useful energy absorbing materials are stated to include lead, aluminum, super plastic alloys, and ice.

Miles, U.S. Pat. No. 4,425,980 discloses beam dampers comprising a beam with flanges and a layer of viscoelastic material between the flanges and the skin of a structure to be damped. The beam can have a cross-sectional I, L, Z, U, or T-shape.

White, U.S. Pat. No. 4,823,522 describes an energy absorbing assembly in which a number of spaced, metallic plate-like elements are coupled together so that the elements are cantilevered from the upper ends thereof. The upper ends can be coupled to a floor beam and the cantilevered ends coupled to a column adjacent the floor beam.

SUMMARY OF THE INVENTION

The present invention relates to an energy dissipating damper which utilizes a damping module (also referred to herein as a damping element) made up of alternating layers of vibration damping material and rigid members (metal plates, for example). A modular damper can be formed from the individual damping module(s) by securing the individual damping modules to the structural members of the damper. The individual damping elements may, for example, be secured or otherwise attached to the structural members of the modular damper via any combination of bolts, dowels, welding, or adhesive bonding, interlocking surface features, or other fastening techniques. The outer rigid members of the module may optionally be extended, allowing the damping element to be more easily bolted, welded, or otherwise fastened to the structural members of the energy dissipating modular damper.

The modular damper approach is unique in that it allows all bonding of the vibration damping material to the rigid members of the damping elements to take place away from the large structural members of the modular damper (when utilizing damping modules having two outer rigid members). This offers tremendous advantages relating to design flexibility, performance testing, customer service, inventory management, manufacturing processes, manufacturing cost, quality, production safety/ergonomics, and shipping.

Dampers are typically tested for energy dissipation capacity and bond strength. One important advantage of the modular damper of the present invention is ease of testing for the energy dissipation capacity and bond strength for each damping module having two outer rigid members. For most large and heavy conventional dampers, in order to evaluate the energy dissipation capacity and bond strength of the manufactured product, the whole damper has to be tested. To test the large and heavy final assembly is difficult, expensive and sometimes impossible. Testing of the smaller damping modules used in the present invention regarding energy dissipation capacity and bond strength is relatively easy allowing for a larger scope sampling plan for these performance tests. A conventional damper is not made up of individual modules which can individually be tested before the final damper is made. Thus, the large damper itself must be tested. This necessitates the use of a large machine capable of a large input force in order to test the damper properties. This large machine is typically a testing unit capable of 200 kips ($9.09 \times 10^4$ kg) to 1000 kips ($4.55 \times 10^5$ kg) high frequency (1 Hz) excitation at displacements of up to 1.5 inches (38 mm) or more. This type of apparatus is very rare and both difficult and expensive to operate. The smaller individual damping elements used in the damper of the present invention may be tested on a relatively small test unit and require a significantly smaller input force due to their smaller physical dimensions.

Another significant advantage is the ability to remove and/or replace the damping modules or elements from the final damper. The damping elements could be unbolted, for example, from the structural members of the damper once the damper has been installed in its functioning location (in a building, bridge, etc.). Damping elements which are adhesively bonded or welded into the damper via outer rigid members could also be removed or replaced. The adhesive bonds may be broken down by the use of solvents and/or heat treatment and/or by cutting to remove the damping elements. Welds may be ground off or flame cut in order to remove the damping elements. Although the damping elements may possibly be damaged during the break down of adhesive bonds or the removal of welds, the structural members of the damper will remain usable. Damping elements installed via bolts or dowels are more convenient to remove and are unlikely to be damaged during a removal process.

It is difficult to remove the damping material for maintenance, testing, replacement of damaged material, or stiffness adjustments from the conventional damper since the damping material is bonded directly to the structural members of the damper (a metal damper chassis, for example). A "damper chassis" is a broad term used to collectively describe all the damper structural members.

Advantages related to improved customer service are possible when using the damper of the modular present invention wherein damping modules can be regularly serviced, tested, modified, or replaced if the energy dissipation capacity is exceeded during operation.

Presently, the widely varying installation environments in a structure require unique dampers from structure to structure, making it difficult to service the market with a standard product.

Another advantage of the present invention is that of readily available inventory. Since damping elements are not manufactured for use in a unique damper, they can be stocked in a number of "standard" configurations. These generic "standard" damping elements could then be incorporated into custom dampers so that custom damper needs could be supported with generic damping modules. Only the structural members (structural chassis, for example) would then be customized for each project.

Furthermore, the installation of a damping element into the final damper by bolting, doweling, welding, interlocking surface features, etc., of the element to the structural members is much simpler than the current bonding process for conventional dampers. For example, with a conventional damper with structural members of structural grade steel beams, it is costly and difficult to fabricate such members to the surface flatness required for bonding and they are large enough to present challenges during the bonding processes.

More specifically, for a complex damper design such as a four sided square tube damper each side must be prepared for bonding, bonded, cured, and then cleaned of cured excess adhesive, if used, in an area tightly constrained by the surrounding damper structural members. Thus, the preparation of conventional dampers is complex. Such problems are overcome by the modular damper of the present invention.

The present invention also provides for ease of material handling. For a bonding factory, the logistics and handling of smaller rigid members of the damping elements (small metal plates, for example) in a precision assembly process is greatly simplified relative to dealing with the large and heavy structural members of the finished damper. These advantages relate to better use of factory space, increased productivity, and less investment required for suitable material handling equipment to handle the larger structural parts safely. Thus, if desired, an outside shop responsible for installing the damping element(s) or module(s) into the final damper could then deal with these final large part logistics.

In addition, the possibility of employing a consistent and predictable shape and size of the damping module rigid members makes automation of the bonding process much simpler than for a conventional damper, and therefore much more feasible from a cost standpoint. The custom nature of current and past dampers, the unpredictable size and shapes of the parts, and the bulk of many of those parts has greatly complicated any consideration of automated production. The variety and uniqueness of past dampers have called for bonding damping material directly to a large assortment of structural members of significant size. Given the custom nature of the damper market, it is impossible to predict future shapes and sizes of the structure members called for and thus it has been prohibitively expensive to automate the bonding process. Even with a custom designed damper, a moduleadapted damper would allow one to automate the damping module bonding and still customize the structural members to meet customer needs. With the present invention the damping element manufacturer would have the option of providing the damping elements to a contractor for installation into the structural members of the final damper. Thus, one would be able to support a custom business in a more cost effective manner.

The present invention also can provide the advantage of consistent bond quality between the vibration damping material and the substrate to which it is bonded. In the present invention the vibration damping material is adhered to smaller rigid members of the damping modules rather than the larger structural members of the damper itself. By excluding the large, heavy, and awkwardly shaped parts which are typical for damper structural members from the bonding process, the bond(s) made between the vibration damping material and rigid members of the damping element can be much more readily controlled.

Also, as mentioned previously, manufacture of a traditional damper requires that the vibration damping material be bonded directly to the large structural members of the damper. In such a circumstance, each structural member must preferably be precision machined to a flatness not greater than 0.005 inch (0.127 mm) in the areas to be bonded to the vibration damping material. This is a very costly process. Sometimes, a large portion of the structural member has to be removed to achieve the flatness requirements, significantly weakening the member.

By utilizing the present invention, the rigid members of the damping element are typically selected to be flat and rectangular and also relatively small in comparison to the structural members. It is much less costly to precision machine the rigid members of the damping elements to the necessary specifications. Thus, in the present invention, the large and bulky structural members no longer need to be machined to a desired flatness since they are no longer involved in direct bonding to the vibration damping material.

In addition, smaller and lighter parts (i.e bonding to smaller rigid members rather than larger heavier structural members) translates to improved safety in production. Automation would contribute further to the safety and ergonomics of bonding the damping modules.

The present invention thus provides a modular damper comprising:

two or more structural members and at least one damping member selected from the group consisting of damping element(s), damping element stack(s), and combinations thereof, wherein each damping element independently comprises:
(i) two outer rigid members;
(ii) at least one layer of a vibration damping material between the two outer rigid members;
(iii) optionally one or more inner rigid members, positioned interior to the outer rigid members, wherein each rigid member in the damping element is separated from another rigid member by at least one layer of vibration damping material; and
(iv) optionally a layer(s) of adhesive between any of the rigid member(s) and vibration damping material layer(s);
wherein each damping element stack comprises two or more damping elements attached together;

wherein said outer rigid members and said structural members and said inner rigid member(s), if present, have shear module greater than the vibration damping material layer(s), wherein each structural member is attached to at least one other structural member via at least one damping member, and wherein the damping member(s) are positioned such that mechanical energy applied to the damper structural member(s) is at least partially dissipated by at least one damping member.

The following modular damper of the invention although more advantageous than conventional dampers is less advantageous than the preceding damper of the invention due to the use of damping element(s) having only one outer rigid member.

Such damping elements are more difficult to replace due to the fact the outer vibration damping material layer is bonded to a structural member. Also, testing of individual damping elements for such a damper is more difficult since a damper/structural member unit will preferably need to be tested together.

The present invention also provides a second modular damper comprising:

two or more structural members and at least one damping member selected from the group consisting of first damping element(s); wherein each first damping element independently comprises:
  (i) one outer rigid member;
  (ii) an outer layer of vibration damping material attached to the outer rigid member, and optionally a layer of adhesive on the side of the outer layer of vibration damping material layer farthest from the outer rigid member.
  (iii) optionally one or more inner rigid members positioned between the outer rigid member and the outer layer of vibration damping material wherein each rigid member in the first damping element is separated from another rigid member by at least one layer of vibration damping material;
  (iv) optionally a layer(s) of adhesive between any of the rigid member(s) and vibration damping material layer(s);

and optionally one or more damping members selected from the group consisting of second damping element (s), second damping element stack(s), and combinations thereof;

wherein each second damping element independently comprises:
  (i) two outer rigid members;
  (ii) at least one layer of a vibration damping material between the outer rigid members;
  (iii) optionally one or more inner rigid members, positioned interior to the outer rigid members, wherein each rigid member in the damping element is separated from another rigid member by at least one layer of vibration damping material; and
  (iv) optionally a layer(s) of adhesive between any of the rigid member(s) and vibration damping material layer(s);

wherein each damping element stack comprises two or more damping elements attached together.

wherein said outer rigid members, said structural members and said inner rigid member(s), if present, have shear module greater than the vibration damping material layer(s);

and wherein each structural member is attached to at least one other structural member via at least one damping member, and wherein the damping member(s) are positioned such that mechanical energy applied to the damper structural member(s) is at least partially dissipated by at least one damping member.

BRIEF DESCRIPTION OF THE DRAWINGS

FIG. 6 illustrates a cross-sectional view of a damping element useful in the modular damper of the present invention.

FIG. 7 illustrates a cross-sectional view of an embodiment of a modular damper of the invention.

FIG. 8 illustrates a cross-sectional view of another embodiment of a modular damper of the invention.

FIG. 9 illustrates a cross-sectional view of another embodiment of a modular damper of the invention.

FIG. 11 illustrates a cross-sectional view of another embodiment of a modular damper of the invention.

FIG. 12 illustrates a cross-sectional view of another embodiment of a modular damper of the invention.

FIG. 23a illustrates an elevational view of a portion of a damping element subject to buckling.

FIG. 23b illustrates a side schematic view (model) of FIG. 23a subject to buckling.

FIG. 26b illustrates a side elevational view of the modular damper of FIG. 26a.

FIG. 26c illustrates a close up elevational view of the modular damper of FIG. 26a.

DETAILED DESCRIPTION OF THE INVENTION

Modular Damper Structural Members

Figure 1:
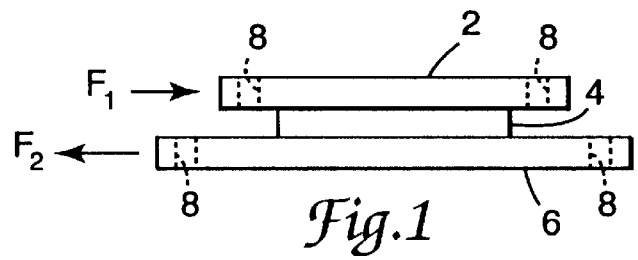
FIG. 1 illustrates a side elevational view of one embodiment of a damping element useful in a modular damper of the present invention.

The modular damper structural members referred to herein can have a variety of forms. They can be in the form of plates, bars, rods, tubes, I-beams, walls, etc. They may be straight, angled, etc. They are typically made from a metal such as steel or aluminum or their alloys, etc. Although the width and length of the structural members of a damper can vary, the width typically ranges from about 4 inches (102 mm) to about 48 inches (1224 mm), more typically from about 6 inches (153 mm) to about 24 inches (612 mm) and the length typically ranges from about 6 inches (153 mm) to about 216 inches (5486 mm), more typically from about 12 (305 mm) to about 144 inches (3658 mm). One skilled in the art of designing energy dissipating dampers for buildings, bridges, etc. would be able to determine the appropriately shaped structural members for a particular use.

Useful structural members include but are not limited to those selected from the group consisting of structural beams including "I" beams, "T" beams, channel beams, angles, tubes, or other structural beam shape. They optionally are gusseted.

Rigid Members

The rigid members which make up the damping element can be formed from a variety of materials depending upon the desired application of the final damper. The rigid member may be formed from a material including but not limited to those selected from the group consisting of metals, such as steel, stainless steel, copper, aluminum, etc.; metal alloys; plastics; and woods. Typically the rigid member is formed from a metallic material such as steel or stainless steel.

The rigid member may have a variety of shapes including but not limited to those selected from the group consisting of plates (such as curved plates, flat plates, etc.), bars, rods, tubes, and I-beams. Typically the rigid members are in the form of plates, most typically plates that are rectangular in shape.

The rigid members (outer and inner, if present) as well as the damper structural members typically have a shear modulus greater than that of the vibration damping layer which also makes up the damping element. The rigid member typically has a shear modulus at least about 10 times greater than that of the vibration damping material layer(s), preferably at least about 100 greater, more preferably at least about 1000 times greater, and most preferably about 10,000 times greater.

The ratio of a shear stress to the corresponding shear strain is called the shear modulus of a material and is represented below by G.

$$G = \text{shear stress/shear strain} \tag{10}$$

For most materials it is one-third to one-half as great as Young's modulus. For further discussion of shear modulus, see *Modern University Physics*, Chapter 10, pp. 210–219, Addison-Wesley Publishing Company, Inc., (1960).

The thickness of the rigid members can vary depending upon the desired application of the damping element. Typically, the thickness of each rigid member ranges from about 1/16 inch (1.5 mm) to about 2 inches (51 mm), preferably about ¼ inch (6 mm) to about 2 inches (51 mm), and most preferably about ½ inch (13 mm) to about 1 inch (25 mm).

If a rigid member is too thin the following problems can occur: buckling and/or failing of the rigid member when the rigid member is subjected to large forces. If a rigid member is too thick the damping module and damper become heavier than necessary and require more room in the building or other structure in which the damper is installed.

The length and width of the rigid members can vary. Typically the width of a rigid member ranges from about 2 inches (51 mm) to about 48 inches (1224 mm), more typically from about 4 inches (102 mm) to about 24 inches (612 mm). The length of a rigid member typically ranges from about 6 inches (153 mm) to about 96 inches (2448 mm), more typically from about 6 inches (153 mm) to about 48 inches (1224 mm). A rigid member differs from a damper structural member in that the rigid member is typically of smaller dimensions than the structural members, in length and/or width.

Vibration Damping Material Layers

A vibration damping material layer may be continuous or discontinuous. A continuous vibration damping material layer may comprise one type of damping material or may comprise adjacent sections of different vibration damping materials, for example. A discontinuous layer may comprise sections of damping material separated by non-damping material(s) or space(s) for example. In addition when at least two damping layers are present each layer may comprise the same or different damping material(s). Preferably, the rigid members are substantially covered with a continuous layer (s) of damping material, although the layer(s) may be discontinuous.

The vibration damping material comprises a viscoelastic material. A viscoelastic material is one that is viscous, and therefore capable of dissipating energy, yet exhibits certain elastic properties, and therefore capable of storing energy at the desired temperature and frequency range. That is, a viscoelastic material is an elastomeric material typically containing long-chain molecules that can convert mechanical energy into heat when they are deformed. Such a material typically can be deformed, e.g., stretched, by an applied load and gradually regain its original shape, e.g., contract, sometime after the load has been removed.

Suitable viscoelastic materials for use in the vibration damping materials of the present invention have a shear storage modulus G', i.e., measure of the energy stored during deformation, of at least about 1 psi ($6.9 \times 10^3$ Pascals) at the operating temperature and frequency (typically about −40° C. to 50° C. and about 0.1 Hz to 15 Hz). The storage modulus of useful viscoelastic materials can be as high as 10,000 psi ($6.9 \times 10^7$ Pascals); however, typically it is about 50–5000 psi ($3.5 \times 10^5$–$3.5 \times 10^7$ Pascals). Particularly preferred viscoelastic materials provide the structure, (the damped building, for example) with a strain energy ratio, i.e., fraction of strain energy stored in the damping material relative to the total strain energy stored in the structure, of at least about 2%.

Suitable viscoelastic materials, at the operating temperature and frequency, for use in the vibration damping materials of the present invention have a loss factor η, i.e., the ratio of energy loss to energy storage or the ratio of the shear loss modulus G" to shear storage modulus G', of at least about 0.1. Preferably the loss factor is at least about 0.5, more preferably greater than about 0.8, and most preferably above 1.0, at the operating frequency and temperature experienced by the material. This loss factor represents a measure of the energy dissipation of the material and depends on the frequency and temperature experienced by the damping material. For example, for Scotchdamp™ SJ2015X Type 110, a crosslinked acrylic polymer, at a frequency of 1 Hz, the loss factor at 68° F. (20° C.) is about 1.3, while at 158° F. (70° C.) the loss factor is about 1.0.

The stiffness of a vibrational damping material layer in shear is calculated as follows:

$$k = k' + jk'' \quad (20)$$

$$= \frac{G'A}{h} + j\frac{G''A}{h} \quad (30)$$

where
k=complex stiffness of the damping material layer
k'=storage stiffness of the damping material layer
k"=loss stiffness of the damping material layer $$j = \sqrt{-1}$$

G'=storage shear modulus of the damping material layer
G"=loss shear modulus of the damping material layer
A=shear area of the damping material layer
h=thickness of the damping material layer Useful vibration damping materials can be isotropic as well as anisotropic materials, particularly with respect to their elastic properties. As used herein, an "anisotropic material" or "nonisotropic material" is one in which the properties are dependent upon the direction of measurement. Suitable materials having viscoelastic properties include urethane rubbers, silicone rubbers, nitrile rubbers, butyl rubbers, acrylic rubbers, natural rubbers, styrene-butadiene rubbers, and the like. Other useful damping materials include polyesters, polyurethanes, polyamides, ethylene-vinyl acetate copolymers, polyvinyl butyral, polyvinyl butyral-polyvinyl acetate copolymers, epoxy-acrylate interpenetrating networks and the like. Thermoplastics and thermosetting resins suitable for use as vibration damping material may also be utilized in the manufacture of damping elements.

Useful vibration damping materials can also be crosslinkable to enhance their strength and processability. Such materials are classified as thermosetting resins. When the viscoelastic material is a thermosetting resin, then prior to the manufacture of the damper, the thermosetting resin is typically in a thermoplastic state. During the manufacturing process, the thermosetting resin can be further cured and/or crosslinked typically to a solid state, although it could be a gel upon curing as long as the cured material possesses the viscoelastic properties described above. Depending upon the particular thermosetting resin employed, the thermosetting resin can include a curing agent, e.g., catalyst, which when exposed to an appropriate energy source (such as thermal energy) initiates the polymerization of the thermosetting resin. Particularly preferred vibration damping materials are those based on acrylates.

In general, any suitable viscoelastic material can be used. The choice of viscoelastic material for a particular set of conditions, e.g., temperature and frequency of vibration, etc., is within the knowledge of one of skill in the art of vibration damping. The selection of a suitable damping material is also based on the processability of the damping material into a damping element (cutting or other fabricating) and the desired structural integrity of the finished damper construction with the damping material selected. It is to be understood that blends of any of the foregoing materials can also be used.

In addition to the viscoelastic material, the vibration damping material of the present invention may include an effective amount of a fibrous and/or particulate material. Herein, an "effective amount" of a fibrous material and/or particulate is an amount sufficient to impart at least improvement in desirable characteristics to the viscoelastic material, but not so much as to give rise to any significant detrimental effect on the structural integrity of the damper in which the viscoelastic material is incorporated. Generally, the fibrous and/or particulate material is used in an amount effective to increase the strain energy ratio of a damper element containing the same amount and type of viscoelastic material without the fibrous or particulate material. Typically, the amount of the fibrous material in the viscoelastic material is within a range of about 3–60 wt % based on the total weight of the vibration damping material. Typically, the amount of the particulate material in the viscoelastic material is within a range of about 0.5–70 wt % based on the total weight of the vibration damping material.

The fibrous material can be in the form of fibrous strands or in the form of a fiber mat or web, although fibrous strands are preferred. The fibrous strands can be in the form of threads, cords, yarns, rovings, filaments, etc., as long as the viscoelastic can wet the surface of the material. They can be dispersed randomly or uniformly in a specified order. Examples of useful fibrous materials include metallic fibrous materials, such as aluminum oxide, magnesium, or steel fibers, nonmetallic fibrous materials, such as fiberglass, natural organic fibrous materials such as wool, silk, cotton, and cellulose and synthetic organic fibrous materials such as polyvinyl alcohol, nylon, polyester, rayon, polyamide, acrylic, polyolefin, aramid, and phenol.

The particulate material useful in the invention can be in the form of nodules, bubbles, beads, flakes, or powder, as long as the viscoelastic material can wet the surface of the particulate. The particulate material can vary in size, but should not typically be greater than the thickness of the damping material layer.

Examples of useful particulate materials include coated or uncoated glass and ceramic bubbles or beads such as thermally conductive bubbles, powders such as aluminum oxide powder and aluminum nitride powder, silica, metal flakes such as copper flakes, cured epoxy nodules, and the like.

In addition to fibers and particulate material, the vibration damping material of the present invention can include additives such as fillers (e.g. talc, etc.), colorants, toughening agents, fire retardants, antioxidants, antistatic agents, and the like. Sufficient amounts of each of these materials can be used to produce the desired result.

Combinations of fibrous material and particulate material would also be useful and would be used in the range of about 0.5 to about 70 weight percent based on the total weight of the vibration damping material.

The preferred viscoelastic material is Scotchdamp™ SJ2015X acrylic viscoelastic polymer, types 109, 110, 112 and 113 available from 3M, St. Paul, Minn., and described in Suggested Purchase Specification, Scotchdamp™ Viscoelastic Polymers, No. 70-072-0225-7(89.3)R1 from 3M Industrial Tape and Specialties Division.

Viscoelastic materials are temperature sensitive. Specifically, Chang et al., "Viscoelastic Dampers as Energy Dissipation Devices for Seismic Applications" in *Earthquake Spectra*, Vol. 9, No. 3 (1993) pp. 371–387, noted that an increase in temperature softens the viscoelastic material and the damping efficiency of the material decreases. Additional temperature sensitivity information on Scotchdamp™ J2015X acrylic viscoelastic polymer, types 109, 110, 112, and 113 is provided in the above-referenced Suggested Purchase Specification.

Accordingly, temperature changes in the viscoelastic material must be considered when selecting vibration damping material to construct the modular dampers of the present invention.

Adhesive Layer

In order to facilitate the adhesion of the vibration damping material layer to the rigid members, a layer of adhesive such as an epoxy is preferably provided between the rigid member and the vibration damping material layer to more effectively bond the layers together. The adhesive used should form a bond between the rigid member and the damping layer having greater strength than the strength of the damping layer itself. Preferably, a structural adhesive is used.

Typically, an adhesive is considered structural if its shear strength is greater than 1000 psi ($6.9 \times 10^6$ pascals), preferably greater than 2000 psi ($1.4 \times 10^7$ pascals), and most preferably greater than 3000 psi ($2.1 \times 10^7$ pascals).

The adhesive layer is preferably moisture resistant and resistant to any solvents, gases, or chemicals it may come into contact with in its operating environment. In addition, the adhesive layer is preferably resistant to plasticizers or residual solvents which may be contained in the damping material. Preferably, the adhesive layer is more resistant than the vibration damping layer to shear strength decreases with increases in temperature. Typically, both the damping material and the adhesive will soften as their temperatures are increased. A preferred adhesive will have a shear strength which exceeds the shear strength of the damping material at all operating temperatures, typically about −40° C. to about 50° C., more typically about 0° C. to about 40° C., most typically about 15° C. to about 35° C.

Damping Element Design and Method of Making

The design of the individual damping elements can vary. Preferably the damping element comprises two outer rigid members: a first outer rigid member and a second outer rigid member and a layer of vibration damping material therebetween. The damping element may optionally further comprise one or more inner rigid members and alternating layers of vibration damping material. The number of alternating layers of vibration damping material and rigid members can vary as long as the structural integrity of the damping element is maintained. Typically, the total number of rigid members (including both outer and inner rigid members) in a damping element ranges from about 1 to about 120, more typically about 2 to about 24 preferably about 2 to about 8, and most preferably about 2 to about 4, for ease of manufacturing. The number of layers most desirable for any damping element will depend also on whether or not strain in the damping layer and/or heat build up in the element during operation is a concern. Using rigid members with good thermal conductivity and specific heat or thermally conductive fibrous or particulate materials in the vibration damping material will reduce heat build up in the damping material.

Preferably, the thermal conductivity of the rigid members should be greater than about 0.2 watts/m degrees C., more preferably greater than about 30 watts/m degrees C., and most preferably greater than about 40 watts/m degrees C.

Another factor to consider in determining the number of layers in the damping element is the available thicknesses of the damping material. For example, if ⅝ inch (15.9 mm) of damping material is required to meet the damping demands and the damping material selected is available in only ⅛ inch (3.18 mm), ¼ inch (6.35 mm), and ½ inch (12.7 mm) thickness, five layers of ⅛ inch (3.18 mm) material may be used in the damping element.

A less preferred damping element is one having one outer rigid member only and an outer vibration damping material layer. As indicated previously such an element may have optional inner rigid member(s) and vibration damping material layer(s) as long as an outer vibration damping material layer is present. The outer surface of the vibration damping material layer (the surface which contacts a structural member) may optionally be coated with an adhesive. Such an element can be bolted, welded, doweled, adhesively bonded, attached via interlocking surface features, etc., to a damper structural member via its one outer rigid member. The damping layer would then be attached to a structural member via conventional means such heat or adhesive bonding. Such an element thus provides some of the advantages of the damping element having two outer rigid members. However, the element has two outer rigid members is much preferred.

Although the method of preparing the damping element can vary a typical process is as follows: First rigid members are provided which typically have been produced to a flatness of about 0.001 inch (0.025 mm) to about 0.025 inch (0.63 mm), preferably about 0.001 inch (0.025 mm) to about 0.015 inch (0.381 mm) and most preferably 0.001 inch (0.025 mm) to 0.005 inch (0.125 mm). If the rigid members are not produced to the desired flatness, difficulty in obtaining the requisite bond strength between the rigid member and the vibration damping layer can occur. This flatness requirement is thus most applicable to the surfaces of rigid members which are actually bonded to a vibration damping layer. Ideally all rigid members utilized regardless of composition: metal, plastic, etc., have of flatness of about 0.001 inch (0.025 mm) to about 0.005 inch (0.125 mm). The exterior surface of an outermost rigid member which comes into contact with the structural members of the damper via bolting, for example, would not necessarily need to have this particular flatness. If an outer rigid member was to be adhesively bonded to the structural members, however, the outer rigid member surface and the structural member surface preferably would meet these same flatness requirements.

A layer of an adhesive such as an epoxy is typically coated onto one surface of the rigid member which is to come into contact with the vibration damping material layer. The thickness of the adhesive layer can vary depending upon the application. Preferably, this adhesive coating is a thin continuous layer. Typically, the adhesive layer has a thickness of about 0.002 inch (0.051 mm) to about 0.050 inch (1.27 mm), preferably about 0.002 inch (0.051 mm) to about 0.015 inch (0.381 mm).

The adhesive layer must be minimally thick enough to provide intimate contact between common bond surfaces of the damping layers and rigid members. Any void in the adhesive layer will reduce the overall bonding strength and concentrate stresses during the modular damper operation and may nucleate a crack in the adhesive layer.

The bond strength is optimized when an adhesive layer having a thickness of about 0.002 inch (0.051 mm) inch to about 0.015 inch (0.381 mm) is used when the preferred structural epoxy is used. Epoxy adhesives generally provide a stronger and more reliable bond between the damping material and rigid member than other adhesives.

The adhesive layers can be coated by a variety of methods such as spraying, troweling, brushing etc. Preferably the adhesive is applied to both the rigid member and vibration damping material layer involved in bonding. Care must be taken not to introduce air into the adhesive layer when bringing the layers to be bonded together. Typically, the adhesive layer is coated onto both the rigid member and the damping material layer by a dispensing nozzle which delivers an adhesive shot to the bond surfaces which is spread uniformly over the bond area. The terms "bond surface" and "bond area" and "shear area" are used interchangeably herein. These terms represent the common surface area between two layers which are bonded.

Next, the adhesive coated layer of vibration damping material is placed on top of the adhesive layer on the first rigid member. If the damping material is liquid, it may alternatively be injected or poured into a mold, in which the rigid members of the damping element have been suitably arranged. The vibration damping material is then cured such that the liquid damping material solidifies.

Additionally, it is possible with some damping materials to form a bond between the damping layers and the rigid members through heat and/or pressure. Any bonding method that produces a bond between damping material layers and rigid members of strength exceeding the strength of the damping material itself is an acceptable method of manufacture. The use of an epoxy adhesive is preferred in the manufacture of the damping elements.

Typically, the vibration damping layer has a thickness of about 0.06 inches (1.5 mm) to about 5 inches (127 mm), preferably about 0.15 (3.8 mm) to about 2 inches (50.8 mm). If the vibration damping material layer is too thin too many damping layers will be needed to keep shear strain at a sufficiently low level to avoid fracture failure in the damping material layers. It is typically desirable from a manufacturing perspective to minimize the required number of damping material layers.

Next, one side of the second rigid member which has been produced to the necessary flatness is provided with a layer of adhesive thereon and is secured to the opposite side of the vibration damping layer which has also been coated with an adhesive layer. The damping element may then be placed in a fixturing device that controls the relative alignment of the layers as appropriate.

However, off-the-shelf fixtures are not readily available for a custom product. Such fixtures however, can be custom made. Typically, an alignment fixture designed for use in manufacturing the damping element of the present invention comprises an expandable steel or aluminum frame equipped with an effective number of "bumpers" or "pads". The frame is typically placed around the unpressed damping element in the expanded state and then engaged such that the bumpers provided form a constraining perimeter around the layers being bonded, holding them in correct alignment until all adhesive bonds have cured sufficiently that the damping element may be moved without damaging the adhesive bonds or disrupting the desired alignment of the layers. The fixture serves the same function for pre-cured damping layers as a mold would serve for liquid damping material in producing damping elements. To state it simply, the fixture merely constrains the damping layer(s), the rigid members, and any optional layers, to produce the correct alignment of the parts in the damping element until all bonds between the damping layers, rigid members, and any adhesive layers have been formed.

The fixture containing the damper element is then placed into a press and pressed to a thickness that accounts for the total thickness of the damping element, including damping material layers, rigid members, and any adhesive layers utilized. Damping elements formed with typical two-part structural adhesives may be allowed to cure at room temperature or in an oven to accelerate the cure (typically at about 32 to about 150 degrees C.). As previously discussed, this method may be modified when the damping material is suitable for use in a heat bonding or hot melt process.

The only limit to the number of layers that may be bonded concurrently with adhesive is the time required to apply adhesive to the appropriate damping element layers and press the element as opposed to the "work life" of the adhesive during which its resistance to flow remains low. If the work life of the adhesive is exceeded, control of the thickness of the various adhesive layers will be reduced. The press pressure must be adequate to flatten the element to the final desired damping element thickness.

As discussed previously, the thicknesses of the rigid members as well as the thicknesses of the vibration damping layers can vary. In each particular damping element the rigid members may have different thicknesses although preferably they each have the same thickness in order to minimize the number of unique parts that must be handled in manufacturing. Also, in each particular damping element each vibration damping layer is typically the same in thickness although damping layers of different thicknesses may be provided. Preferably, the vibration damping layers in a particular element are the same thickness in order to minimize the number of unique parts that must be handled in manufacturing, and thus reducing the parts inventory, requiring fewer assembly fixtures, facilitating automation, and increasing the ease and convenience of manufacture.

The total thickness of each damping element or damping element stack is preferably the same for damping elements located between the same two modular damper structural members, simply for logistical reasons in installing the damping elements. There is no requirement that all layers of such placed damping elements have the same shape, thickness, area, or material composition. It is preferred, but not required, that each damping element incorporated into a given damper is of similar construction in terms of the number of layers and materials. Size in terms of width and length of the individual damping elements may vary within the damper for purposes of utilizing a "mix and match" damper design. By a "mix and match" damper design it is meant that the damping elements having different energy dissipation capacities are used in the damper to yield a final damper having the desired energy dissipation capacity.

As mentioned previously, the damping elements may be prepared to have different energy dissipation capacities. This can be done by altering the composition of the damping layers or the thickness and/or shear area of the damping layers.

The damping layer itself is typically selected to operate at shear strains up to 100%. Bond strength between the damping material layer and rigid member should be large enough to withstand maximum damper operating stress. As such, the overall shear strength of the damping elements should be at least adequate to ensure that the damping material will fail cohesively before any of the bond interfaces delaminate or the adhesive itself fails cohesively.

The damping element is preferably assembled and attached to the damper structural members with minimal introduction of strain in the damping material layers. It is common practice that this initial strain in the damping material in a damper in general should be below 5% and preferably below 2%. Normally, this requires that the thickness variation of the damping material layer be less than 10%.

Assuming the damping element is produced with minimal strain in the damping material layers, the element is preferably produced such that all bond surfaces of the rigid members and any bond surfaces of the damper structural members are substantially parallel, most preferably parallel. The term "bond surface" as used herein refers to a surface in direct interface with a damping material layer, or indirect interface via an adhesive bond, with a damping material layer. This is done so that the bond interfaces between the damping material layers and adjacent rigid members or adjacent damper structural members will experience primarily shear stresses during operation of the damper. Departure from parallelism between the bond surfaces of these members will introduce additional stresses on the bonds during damper operation. This does not limit the shape of the rigid members to strictly flat plates. As long as the bond surfaces of the rigid members and the bond surfaces, if present, of the damper structural members remain parallel or substantially parallel, some or all of the rigid members may be contoured or tapered. Note that the bond surfaces of rigid members with varying thickness can be kept parallel or substantially parallel to each other or to the bond surface of the damper structural members if the structural members to which they are attached are provided with matching or substantially matching surface features, respectively.

While it is preferred the damping element(s) are manufactured such that its rigid member bond surfaces are substantially parallel, (most preferably parallel) and that the damping element(s) or damping element stack(s) are attached to the damper structural members such that these bond surfaces and any bond surfaces of the damper structural members remain substantially parallel (most preferably parallel), provision is also preferably made to hold these bond surfaces substantially parallel or parallel during operation of the modular damper. Forces acting on the damper structural members can cause them to move apart, pulling the bond surfaces of the damping element rigid members or damper structural members out of parallel. Use of a shouldering rod or clamped spacer, or any other means of maintaining proper alignment of the damper structural member bond surfaces and/or rigid member bond surfaces during damper operation are acceptable methods of holding said bond surfaces substantially parallel or parallel.

The damping members (damping element(s) and/or damping element stack(s)) should be positioned within the damper such that mechanical energy applied to the damper's structural member(s) is at least partially dissipated by at least one damping member(s), (preferably all the damping members when more than one is present) preferably at least about 10% dissipated, more preferably at least about 25% dissipated, most preferably at least about 50% dissipated.

Calculation of Energy Dissipation Capacity in Damping Element and Damper

A damping element is designed so that it has a specific energy dissipation capacity. For a damping element with a damping material that behaves linearly, i.e. one unit of input force results in one unit of displacement in the damping material throughout the range of input forces encountered, the storage stiffness (k') and loss factor ($\eta$) are used to characterize the energy dissipation capacity of a damping element. For a harmonic response, the energy dissipation per cycle ($E_{element}$) is determined as:

$$E_{element} = \pi x^2 k' \eta \tag{40}$$

wherein:

x=displacement amplitude;

k'=storage stiffness of the damping element $\eta$=loss factor

Equation 40 may also be used to calculate energy dissipation for a modular damper by substituting the storage stiffness and loss factor of the entire modular damper for k' and $\eta$, respectively.

Consider first the simplest embodiment of a damping element having two outer rigid members as shown in FIG. 1. FIG. 1 illustrates a damping element made up of two outer rigid members 2 and 6, one vibration damping material layer 4, and no interior inner rigid member layers or adhesive bonds joining the vibration damping material layer to the two outer rigid layers. It is assumed a heat bond has accomplished the joining of the vibration damping layer to the rigid members shown. The element is considered to possess a complex stiffness ($k_{element}$) as defined by:

$$k_{element} = k'_{element} + jk''_{element} \tag{50}$$

wherein:

$$j = \sqrt{-1};$$

$k_{element}$=complex stiffness of damping element;

$k'_{element}$=storage stiffness of damping element; and $k''_{element}$=loss stiffness of damping element The ratio of $k''_{element}$ to $k'_{element}$ is defined as the loss factor of the damping element.

$$\eta_{element} = \frac{k''_{element}}{k'_{element}} \tag{60}$$

This complex stiffness of the damping element illustrated in FIG. 1 can be calculated as the complex stiffness of the individual layers combined in series:

$$\frac{1}{k_{element}} = \frac{1}{k_{R_1}} + \frac{1}{k_{R_2}} + \frac{1}{k_D} \tag{70}$$

$$= \frac{1}{k'_{R_1} + jk''_{R_1}} + \frac{1}{k'_{R_2} + jk''_{R_2}} + \frac{1}{k'_D + jk''_D} \tag{80}$$

wherein:

$k_{R_1}$=complex stiffness of rigid member 2

$k'_{R_1}$=storage stiffness of rigid member 2

$k''_{R_1}$=loss stiffness of rigid member 2

$k_{R_2}$=complex stiffness of rigid member 6

$k'_{R_2}$=storage stiffness of rigid member 6

$k''_{R_2}$=loss stiffness of rigid member 6

$k_D$=complex stiffness of vibration damping layer 4

$k'_D$=storage stiffness of vibration damping layer 4

$k''_D$=loss stiffness of vibration damping layer 4

Figure 2:
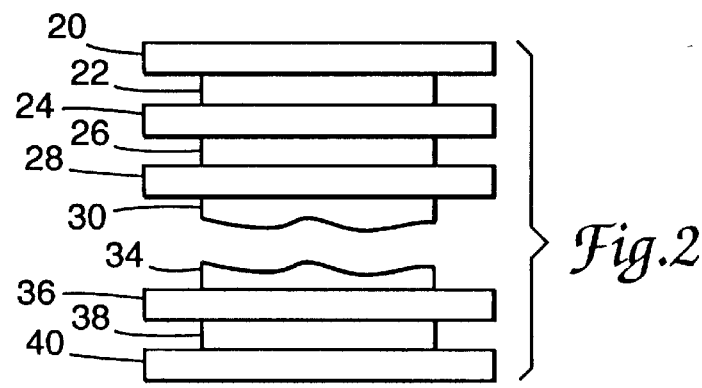
FIG. 2 illustrates a side elevational view of another damping element useful in the modular damper of the present invention.

FIG. 2 illustrates a damping module having outer rigid members $R_1$ identified as 20 and $R_N$ identified as 40, inner rigid members $R_2$ identified as 24, $R_3$ identified as 28, and $R_{N-1}$ identified as 36. The damping module has vibration damping material layers $D_1$ identified as 22, $D_2$ identified as 26, $D_3$ identified as 30, $D_{M-1}$ identified as 34, and $D_M$ identified as 38.

For a general case of a heat bonded damping element, as shown in FIG. 2, comprised of any number of rigid member layers (N) and vibration damping layers (M), the series combination of the complex stiffnesses of the individual layers is given by:

$$\frac{1}{k_{element}} = \sum_{n=1}^{N} \frac{1}{k_{R_n}} + \sum_{m=1}^{M} \frac{1}{k_{D_m}} \qquad (90)$$

wherein:

N=the number of rigid members in the damping element (including inner and outer rigid members)

M=the number of vibration damping layers in the damping element $k_{R_n}$=the complex stiffness of the nth rigid member $k_{R_m}$=the complex stiffness of the mth vibration damping layer Since the rigid members of the damping element are usually selected such that $|k_{R_n}| \gg |k_{D_m}|$ for any n and any m, the contribution of the rigid member layers to the overall damping element complex stiffness will be negligible compared to that of the vibration damping layers. This may be represented by reducing Equation 90 as follows:

$$\frac{1}{k_{element}} = \left(\sum_{n=1}^{N} \frac{1}{k_{R_n}}\right)^{0} + \sum_{m=1}^{M} \frac{1}{k_{D_m}} \qquad (100)$$

so that:

$$\frac{1}{k_{element}} \cong \sum_{m=1}^{M} \frac{1}{k_{D_m}} \qquad (110)$$

As noted previously in Equations 20 and 30, the complex stiffness of the individual vibration damping material layers in shear is given by:

$$k_{Dm} = \frac{G'_{D_m} A_{D_m}}{h_{D_m}} + j\left(\frac{G''_{D_m} A_{D_m}}{h_{D_m}}\right) \qquad (120)$$

wherein:

$k_{D_m}$=complex stiffness of the vibration damping material layer $G'_{D_m}$=storage shear modulus of the vibration damping material layer $G''_{D_m}$=loss shear modulus of the vibration damping material layer $$j = \sqrt{-1}$$

Figure 10:
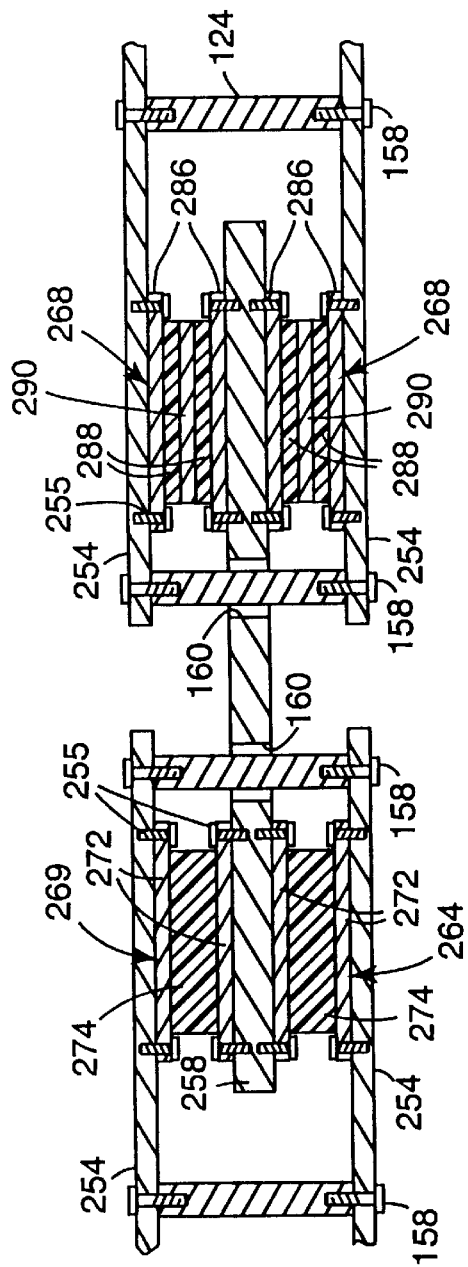
FIG. 10 illustrates a cross-sectional view of another embodiment of a modular damper of the invention.

$A_{D_m}$=shear area of the vibration damping material layer $h_{D_m}$=thickness of the vibration damping material layer Equations 110 and 120 may be employed to tune the complex stiffness of a damping element. Increasing $G'_{D_m}$, $G''_{D_m}$ and $A_{D_m}$ of any vibration damping layer, for example, will result in an increase in $k_{D_m}$ and $k_{element}$. Likewise, increasing $h_{D_m}$ of any vibration damping layer will have the effect of reducing $k_{D_m}$ and $k_{element}$. One skilled in the art could thus modify equation 120 to account for the effect of adhesive layers on complex stiffness for a damping element constructed with adhesive bonds between the rigid member layers and vibration damping layers. Once the complex stiffnesses of the individual damping elements of a given damper are known, the total complex stiffness of the entire damper can be determined. FIGS. 8, 9, and 10 show three representative ways in which damping elements may be combined to form a damper: in parallel (FIG. 8), in series (FIG. 9), or in a combination of parallel and series (FIG. 10). Other configurations are also possible. A modular damper is considered to be composed of damping elements in parallel if the damping elements are rigidly attached, directly or indirectly, between common ground points and the displacement experienced by (said parallel) damping elements at any time is the same as the displacement of the modular damper itself FIG. 12 shows the absolute displacement of the damping elements ($\Delta x$) and the entire damper ($\Delta X$). Note that elements 386 and 388 in this FIG. 12 are in parallel since:

$$\Delta x_{386} = \Delta x_{388} = \Delta X \qquad (130)$$

If there is no slippage between the damping elements and the damper structural members and all rigid members and all the structural members of the damper are sufficiently rigid, a damper composed of a number of damping elements in parallel can be calculated by:

$$k_{damper} = \sum_{q=1}^{Q} k_{element_q} \qquad (140)$$

where:

$k_{damper}$=complex stiffness of a modular damper

Q=the number of damping elements in parallel $k_{element_q}$=complex stiffness of the qth damping element.

Similarly, a modular damper comprises damping elements in series if the damping elements are attached in a stack arrangement and the force acting through each of the individual damping elements is the same. Damping elements connected in series thus can also be referred to as a stack. Assuming once again that no slippage occurs between the damping elements and the damper structural members and that all rigid members and all the structural members of the damper are sufficiently rigid, the complex stiffness of a damper composed of a number of damping elements in series may be determined by:

$$\frac{1}{k_{damper}} = \sum_{s=1}^{S} \frac{1}{k_{element_s}} \quad (150)$$

where:

$k_{damper}$=complex stiffness of a modular damper

S=the number of damping elements in series $k_{element_s}$=complex stiffness of the sth damping element.

An example of a modular damper made up of damping elements A 172, B 174, C 174, and D 176 in parallel is shown in FIG. 8. Applying Equation 140 to this damper yields:

$$k_{damper} = k_A + k_B + k_C + k_D \quad (160)$$

where $k_A$, $k_B$, $k_C$, and $k_D$=complex stiffnesses of damper elements A, B, C and D, respectively.

An example of a modular damper made up of damping elements E 227 and F 237 in series is shown in FIG. 9. Applying Equation 150 to this damper yields:

$$\frac{1}{k_{damper}} = \frac{1}{k_E} + \frac{1}{k_F} \quad (170)$$

where $k_E$ and $k_F$=complex stiffness of the damping elements E and F, respectively.

FIG. 10 illustrates a more complex modular damper where damping elements H269 and I264 are in parallel and upper element J268 and lower element K268 are in parallel, but the combined complex stiffness of elements H269 and I264 are in series with the combined complex stiffness of elements J268 and K268. With the usual assumptions that 1) no slippage occurs between the damping elements and the structural members of the damper and 2) structural members and rigid members of the damper are selected to be sufficiently rigid, the resulting complex stiffness of the damper shown in FIG. 10 is:

$$\frac{1}{k_{damper}} = \frac{1}{(k_I + k_H)} + \frac{1}{(k_J + k_k)} \quad (180)$$

One skilled in the art could extend this result to calculate the stiffness of a modular damper employing any number of series and parallel combinations of damping elements.

Installation of Damping Element(s) into the Modular Damper

Figure 4:
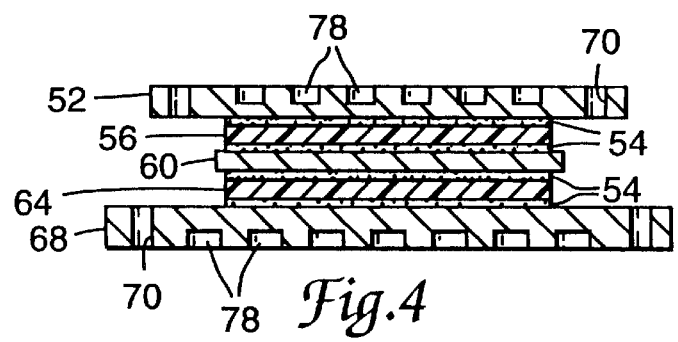
FIG. 4 illustrates a cross-sectional view of another embodiment of a damping element useful in the modular damper of the present invention.
Figure 13:
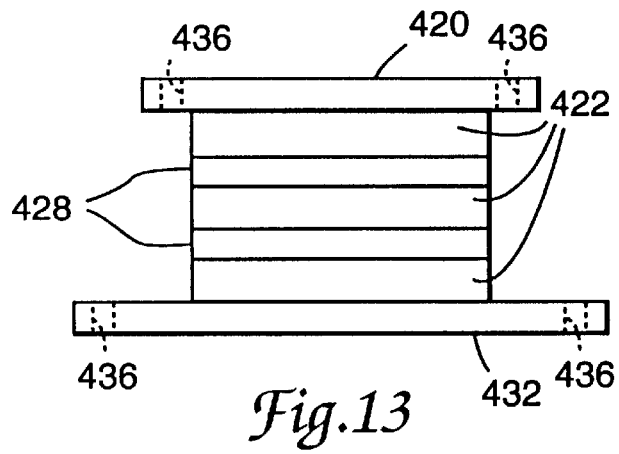
FIG. 13 illustrates a side elevational view of another embodiment of a damping element useful in the modular damper of the invention.
Figure 14:
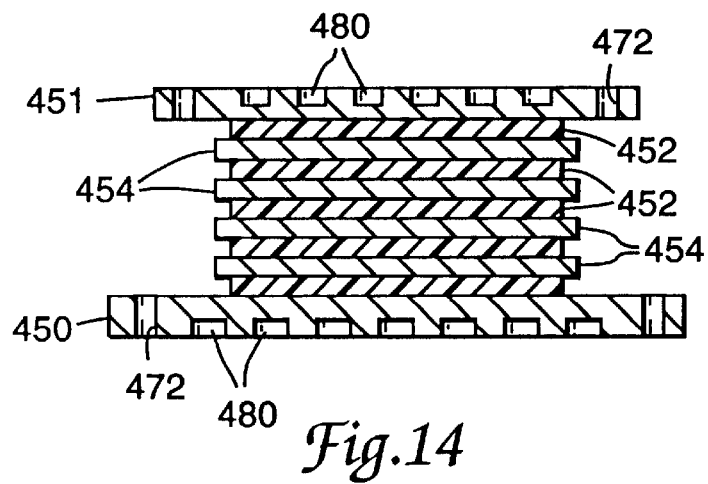
FIG. 14 illustrates a cross-sectional view of another embodiment of a damping element useful in the modular damper of the invention.

The damping elements are typically constructed such that the outer rigid members are of different lengths when bolts are used as the connecting means as in FIG. 1, FIG. 4, FIG. 13, and FIG. 14. For example, the inner rigid members, if present, would typically be of the same shear area as that of the damping layers as in FIG. 13. Alternately, the inner rigid members may extend past the damping layers as shown in FIG. 4, FIG. 6 and FIG. 14 to facilitate heat dissipation in the damping element during operation. Typically, when bolts are used, the outer rigid members are of different lengths so that the bolt holes in one are located farther from the damping layers than in the other to prevent interference between the bolts during installation of the element into the damper.

For a damper having two outer structural members and one center structural member, one of the damping elements is typically first attached to the center structural member, where one of the outer rigid member bolt locations (when bolts are used) are easily accessible with tools due to the staggered lengths of the two outer rigid members of the damping element. An outer structural member of the damper is then connected to the other outer rigid member of the damping element. A similar bolting operation can be followed when inserting one or more damping elements between the center structural member and the other outer structural member.

Different means of attaching the damping elements to the structural members of the dampers may be used such as nuts/bolts, dowels, welding, interlocking surface features, bonding, etc. Each particular method has its own advantages and disadvantages. Bolting, for example, allows quick and easy installation of the damping element. In addition, no heat is required during bolting which could soften the damping material layers and any adhesive layers that are present. A disadvantage of bolting is that it sometimes permits slippage between the damping element and the structural member(s) due to the bolt hole clearance when the friction force between them is smaller than the force experienced in the damper.

The slippage in the damper will decrease the efficiency, i.e., its ability to function as a damper, of the damper. This decrease results from the amount of damper displacement that is not transferred to the damping material through the rigid members when the bolts are moving within the space of the hole clearance. Closely fitted parts (i.e., damping elements and damper structural members) transfer substantially all of the energy input into the damping layers whereas loosely fitted parts will result in less energy transferred to the damping material layer(s). Buckling in the rigid members and structural members is also a concern when bolting although this is a concern for all the methods of damping element attachment. Another disadvantage of bolting is that the outer rigid members may need to be extended past the damping layers to allow for the bolting, thus increasing the length of the damping element.

Thus, the damping elements are typically first attached to the center structural member of the damper (when a damper having three structural members as in FIG. 7, FIG. 8, FIG. 9, FIG. 11, FIG. 12, FIG. 18, and FIG. 20 is being prepared) followed by attachment to the outer structural members.

The damping elements can be installed into the damper differently. If one damping element is to be installed between two structural members the damping element is typically installed such that each outer rigid member surface of the damping element is attached to the surface of a different structural member.

If three damping elements are to be installed in series between two structural members of a damper, the damping elements may be vertically stacked and attached to each other via their outer rigid members with the exposed top and bottom outer rigid members of the stack each being attached to a separate structural member. See FIG. 11.

Thus, the outer first rigid member surface of a first damping element would be attached to a first structural member surface, and the second outer rigid member surface of the damping element attached to a first outer rigid member surface of a second damping element. The second outer rigid member surface of the second damping element is attached to a first rigid member surface of a third damping element. The second outer rigid member surface of the third damping element would then be attached to a surface of the second structural member.

Thus, two or more vertically stacked and attached damping elements may be attached between two structural members.

Another representative situation is when three damping elements rather than being stacked vertically are positioned horizontally to each other such that the first outer rigid member surface of each damping element is attached to a first structural member surface and the second outer rigid member surface of each damping element is attached to a surface of the second structural member. Such elements are thus configured in parallel between said first and second structural members of the damper.

Other configurations and numbers of damping elements are also possible.

Welding is a relatively easy means of attaching the damping element(s). Very little reduction in damper efficiency can occur due to the minimal slippage between the rigid members and structural member as long as the welds remain intact. In addition, the outer rigid members may not have to be extended in order for the damping element to be installed into the damper. A disadvantage of welding is that heat generated during the process can raise the temperature of the damping material layers and/or adhesive layers thus introducing a risk of damaging the bonds or damping material.

Bonding of the damping elements into the damper via adhesives is advantageous in that it is less likely that buckling will occur in the outer rigid members of the damping elements. It is also advantageous in that extension of the outer rigid members past the damping layers is not required. A great disadvantage of adhesive bonding is that it is more difficult and time consuming than other methods. The damper must be handled carefully until the adhesive has set or hardened.

Doweling of the damping elements is advantagous in that the occurance of slippage compared to bolting is reduced. In addition, it is easy to attach the damping elements to the damper structural members via doweling. Also, the rigid members do not have to be extended in order to attach the damping element. A disadvantage of doweling is that precision machining of the dowel holes in the damper structural members is required. It is necessary to have a precision fit between the dowel and dowel hole so that there is no loss of damper efficiency.

The possible buckling of the outer rigid members of the damping element(s) is a factor that must be taken into consideration when constructing the modular damper of the present invention. Buckling can occur when an outer rigid member is subjected to excessive compression load during the operation of the damper (See FIG. 23a). As an example, assume that the outer rigid member is only firmly attached to a structural member at one end of the rigid member and the load P is applied on the other end of the rigid member as shown in FIG. 23b. The critical load ($P_{cr}$) for rigid member buckling is calculated as $$P_{cr} = \frac{\pi^2 EI}{4L^2} \quad (190)$$

where $$I = \frac{wh^3}{12} \quad (200)$$

w=width of the rigid member
h=thickness of the rigid member
L=length of rigid member
E=the modulus of elasticity of the rigid member.

If the actual load applied to the rigid member is close to the critical buckling load, the rigid member can be thickened, widened, or shortened to increase the critical load.

Strength of Rigid Member, Structural Members, and Fasteners

The outer rigid members of a damping element and the mechanical fasteners which may be used between these outer rigid members and a damper structural member and/or an outer rigid member of another damping element must be strong enough to transfer forces between said members. Discussion of bolted, doweled, and riveted joints can be found in Chapter 8 of *Mechanical Engineering Design*, 5th Edition, authored by J. E. Shigley and C. R. Mischke, published by McGraw-Hill, Inc. 1989.

Each particular bolt (or dowel, etc.,) pattern will have its own advantages and disadvantages and should be selected based upon the materials used and the anticipated end use of the damper. A representative example of a possible bolt pattern includes bolts encompassing the perimeters of the outer rigid members of the damping element as in FIG. 15c. Another representative example of a possible bolt pattern involves a series of bolts on the widthwise (FIG. 15a) or lengthwise (FIG. 15b) edges only of the outer rigid members. The preferred bolt (or dowel, etc.) configuration depends on the space constraints of the damper and the input load to the damper during operation.

Figure 15E:
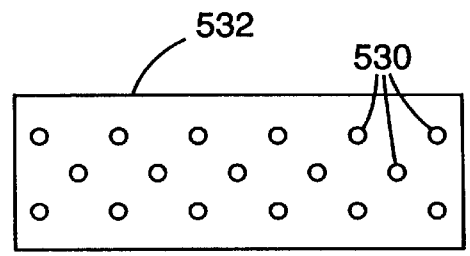
Figure 16A:
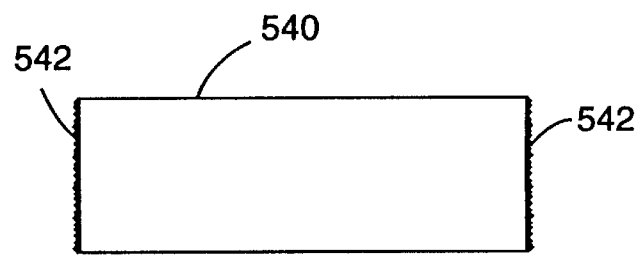
FIGS. 16a–c illustrate plan views of different embodiments of damping elements useful in the modular dampers of the invention showing possible welding locations.
Figure 16B:
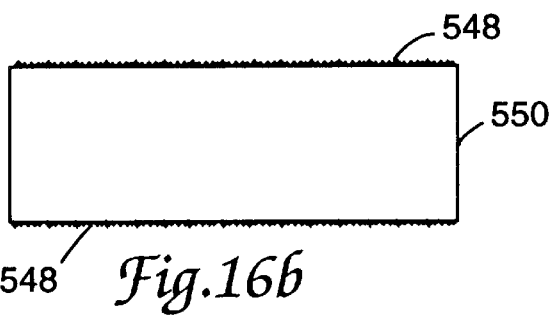
Figure 15D:
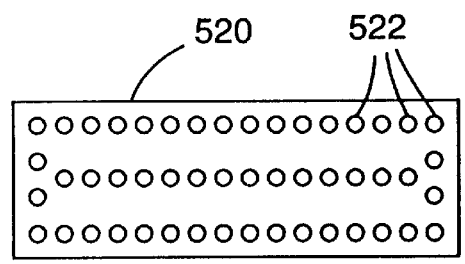
Figure 16C:
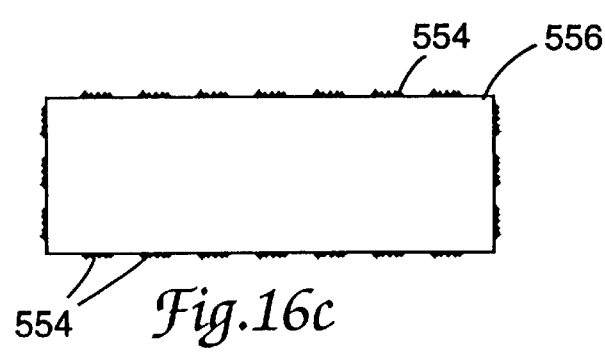

Similar examples are also shown for welding in FIG. 16a where the entire widthwise edge has been welded, FIG. 16b where the entire lengthwise edge has been welded, and FIG. 16c where spot welds have been placed around the perimeter of the outer rigid member. FIGS. 15d and 15e show two representative dowel pin hole arrangements.

The following factors are taken into account in determining a bolting configuration: the possible buckling of a rigid member, the size of the parts involved in bolting (for example, rigid members and damper structural members may need to be lengthened and/or widened to accomodate bolt holes), the size and quantity of bolts adequate to generate sufficient friction to prevent slippage of the damping element rigid members against the damper structural members; the need to access the bolts for installation and removal; and the need to have clearance for installation and removal of the damping elements.

Figure 17:
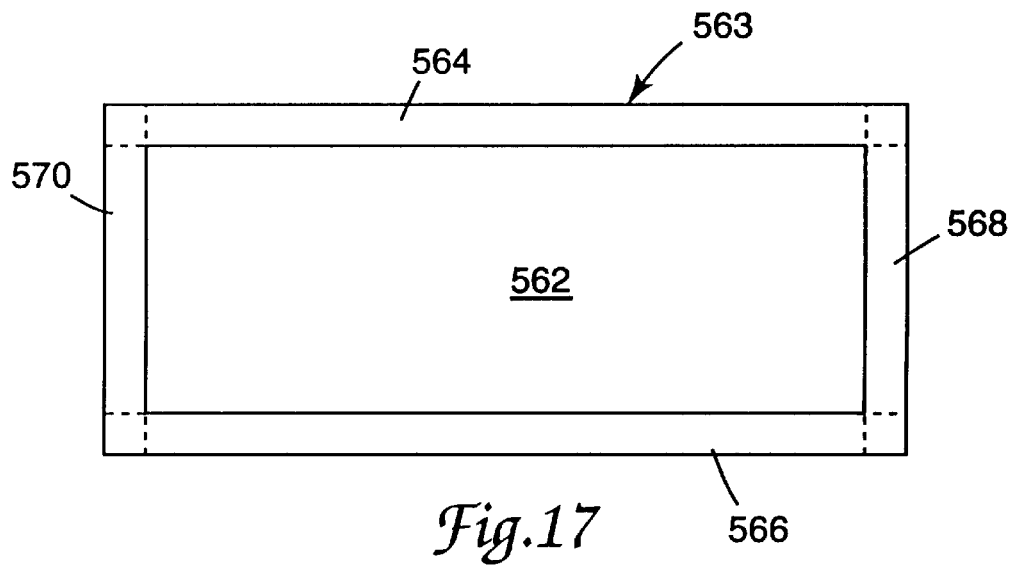
FIG. 17 illustrates a top plan view of a rigid member of a damping element useful in a modular damper of the invention.

FIG. 17 shows a generalized outer rigid member sectioned into regions 564 and 566 (lengthwise edges), 568 and 570 (widthwise edges), and 562 (interior). The boundary between the edges and the interior is the edge of the bond surface in contact with the adjacent damping layer. Note that every damping element will have an interior region but edge regions may not always be present, for example in FIG. 5 where the damping layers have the same length and width as the outer rigid members. For any general case, however, attachment locations may be selected in any pattern in any one or more of these regions as long as all factors previously mentioned have been suitably accounted for. Additionally, a given damping element may be attached by any combination of methods, for example FIG. 4 shows an element whose outer rigid members are attached by a combination of bolts and dowel pins. Any bolt configuration can be employed as long as size constraints on the damper and design loads on the bolts and other parts are not exceeded. Similar considerations apply to other fastening methods.

Installation of the Modular Damper into a Structure

The modular damper of the present invention can be utilized in a number of structures including but not limited to the following: buildings, bridges, towers, (such as water towers, equipment towers etc.) chimneys, machines, equipment, floors, facades, vehicles, monuments, statues, sculptures, solar panels, telescopes, trusses, dams, roofs, etc.

The modular damper of the invention may be installed in the ultimate structure to be damped in a variety of locations depending upon the desired damping effect. For example, the modular damper may be connected via its damper structural members to secondary structural members of the structure to be damped (such as a building). These secondary structural members of the structure are then typically connected directly to the primary structural members of the structure to be damped. See FIG. 20 where the modular damper is connected via its damper structural members 806 and 810 to secondary structural members 816, 820 and 822 of the structure to be damped.

The term "primary structural members," as used herein, refer to load bearing columns, girders, walls, and braces of the superstructure. "Secondary structural members," as used herein, refer to connecting members between primary structural members and damper structural members. In the absence of a damper, these secondary structural members carry only the load resulting from their own weight.

Another method of installation involves connecting the structural members of the damper directly to the primary structural members of the structure to be damped. In this circumstance the structural members of the damper would typically need to be elongated in relation to the previous case in order that they would be capable of reaching the primary structural members of the structure to be damped.

Other methods of placement and location of the modular damper of the invention into the structure to be damped will be understood by those skilled in that art.

The present invention may be better understood by referring to the following figures.

FIG. 1 illustrates a damping module comprising outer rigid members 2 and 6 and vibration damping material layer 4. Outer rigid member 6 extends beyond outer rigid member 2 in order to facilitate the installation of the module into a damper. Bolt holes 8 are contained in outer rigid members 2 and 6. $F_1$ and $F_2$ represent the forces acting on the damping module.

Figure 3:
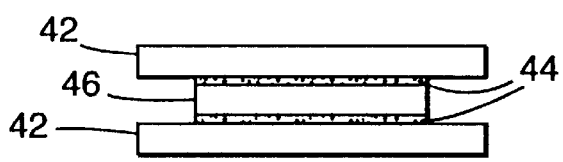
FIG. 3 illustrates a side elevational view of another embodiment of a damping element useful in the modular damper of the present invention.

FIG. 3 illustrates a damping module comprising outer rigid members 42, adhesive layers 44 and vibration damping material layer 46.

FIG. 4 illustrates a damping module comprising an outer rigid member 52, an outer rigid member 68, an inner extended rigid member 60 and vibration damping material layers 56 and 64. Adhesive layers 54 are used between the rigid member and vibration damping material layer interfaces. Bolt holes 70 and dowel holes 78 are present in the outer rigid members 52 and 68.

Figure 5:
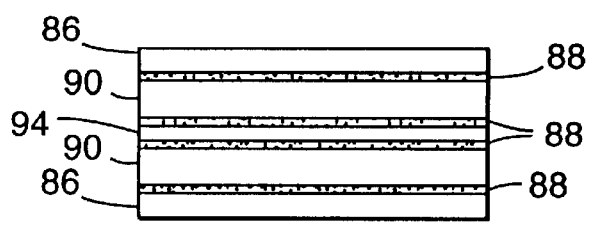
FIG. 5 illustrates a side elevational view of another embodiment of a damping element useful in the modular damper of the present invention.

FIG. 5 illustrates a damping module having outer rigid members 86 and vibration damping material layers 90 and 94. Adhesive layers 88 are present between the rigid member and vibration damping material layer interfaces.

FIG. 6 illustrates a damping module comprising outer rigid members 104 and vibration damping material layers 106 with filleted edges. An inner rigid member layer 108 is bonded between the vibration damping material layers 106. The inner rigid member extends beyond the damping layers 106 and the outer rigid members 104.

FIG. 7 illustrates one embodiment of a modular damper of the invention. The damper comprises outer structural members 114 and center structural member 116. The damper also comprises individual damping elements 117 attached between the outer structural members 114 and the center structural member 116 via bolts 150, nuts 151 and dowels 161 and 162. Each damping element 117 comprises outer rigid members 140, inner rigid members 142 and vibration damping material layers 144. Outer structural members 114 are connected via shoulder rods 122 and bolts 158. Outer structural members 114 are also attached to primary structural member 120. Shoulder rods 122 and 124 pass through holes 160 in the center structural member 116.

Although the damping elements 117 are represented herein as identical, each individual damping element 117 could have a different stiffness value. For example, two elements may each have 5 units of stiffness, whereas two other damping elements may each have 10 units of stiffness, while the remaining two damping elements may each have 50 units of stiffness, thus resulting in 65 units of stiffness per side with respect to the center structural member 116 if damping elements 117 having the same stiffness were positioned on opposite sides of the center structural member 116.

FIG. 8 illustrates a modular damper having outer structural members 166 and inner structural member 168. The damper further comprises damping elements 172, 176, and 174, bolted between the inner structural member 168 and the outer structural members 166. Damping element 172 comprises outer rigid members 180, inner rigid members 182 and vibration damping material layers 184 bonded between the rigid members. Damping elements 176 comprises outer rigid members 190 and vibration damping material layer 192 bonded therebetween. Damping elements 174 comprise outer rigid members 196, inner rigid member 200, and vibration damping material layers 198. The outer rigid members on all the damping elements extend beyond the vibration damping material layers and any inner rigid members, if present, to facilitate bolting of the damping elements to the inner 168 and outer 166 structural members via bolts 216. Shoulder rods 124 which pass through holes 160 in inner structural member 168, connect outer structural members 166 via bolts 158.

FIG. 9 illustrates a modular damper, constructed using a "series" of damper modules, comprising outer structural members 226 and 248, inner structural member 234, and damping elements 227 and 237. Damping element 227 which is bolted between outer structural member 226 and inner structural member 234 via bolts 250 comprises outer rigid members 228 and vibration damping material layer 230 bonded therebetween. The outer rigid members 228 extend beyond the vibration damping material layer 230. Damping element 237 comprises outer rigid members 246, inner rigid member 240, and vibration damping material layers 238 bonded between the rigid members. Each outer rigid member 246 extends beyond the inner rigid member 240 and the vibration damping material layers 238.

FIG. 10 illustrates a modular damper comprising outer structural members 254 and inner structural member 258. Damping modules 264 and 268 are bolted therebetween via bolts 255. Damping module 264 comprises outer rigid members 272 and vibration damping material layer 274 bonded therebetween. Damping module 268 comprises outer rigid members 286, inner rigid member 290 and vibration damping material layers 288 bonded therebetween. The outer rigid members 272 and 286 extend beyond the inner rigid members 290, if present, and the vibration damping material layers 274 and 288 for all the damping elements, 269, 264, and 268. Shoulder rods 124, two of which pass through holes 160 in inner structural member 258, connect outer structural members 254.

FIG. 11 illustrates a modular damper comprising outer structural members 308, center structural member 310 and damping elements 314 and 316 welded therebetween. Damping element 314 is welded to structural element 308 and also to damping element 316 via welds 344. Damping element 316 is also welded to center structural member 310 via welds 344. Damping element 314 comprises outer rigid members 334 and inner rigid member 338 and vibration damping material layers 336 and 340, which have different thicknesses, bonded therebetween. Damping element 316 comprises outer rigid members 346 and vibration damping material layer 347 bonded therebetween. Outer structural members 308 are connected via bolts 326 and shoulder rods 324. Shoulder rods 324 pass through structural member 310 via holes 160. The purpose of shoulder rods 324 is to keep outer structural members 308 parallel during operation of the damper.

FIG. 12 illustrates a modular damper comprising outer structural members 380 and 384, inner structural member 382, and damping elements 386 and 388 welded therebetween via welds 408. Damping element 386 comprises outer rigid members 394 and vibration damping material layer 390 bonded therebetween. Damping element 388 comprises outer rigid members 394 and vibration damping material layer 390 bonded therebetween. $F_1$ illustrates force in outer structural member 380. $F_2$ illustrates force in outer structural member 384. $F_3$ illustrates force in inner structural member 382. $\Delta x$ illustrates the relative displacement between the two outer rigid members 394 of each damping modules 386 and 388. $\Delta X$ illustrates the relative displacement between the center structural member 382 and the outer structural members 380 and 384 of the modular damper.

FIG. 13 illustrates a damping module comprising outer rigid members 420 and 432 and alternating layers of vibration damping material layers 422 and rigid members 428 bonded therebetween. Outer rigid member 420 and outer rigid member 432, which extends beyond outer rigid member 420, both possess bolt holes 436.

FIG. 14 illustrates a damping module comprising outer rigid members 450 and 451 and alternating layers of vibration damping material layers 452 and inner rigid members 454. The inner rigid members 454 extend beyond the vibration damping material layers 452. The outer rigid members 450 and 451 contain bolt holes 472 and dowel holes 480.

Figure 15A:
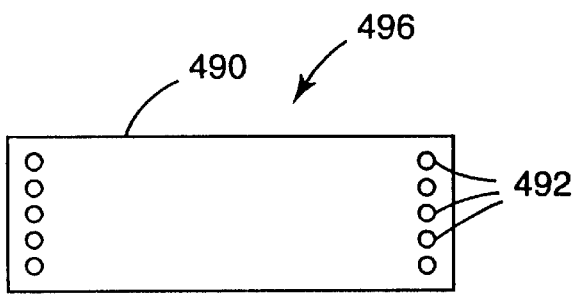
FIGS. 15a–e illustrate plan views of different embodiments of damping elements useful in the modular dampers of the invention showing fastening hole locations.
Figure 15B:
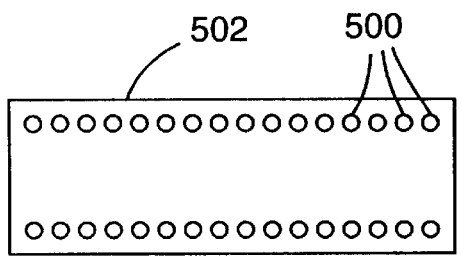
Figure 15C:
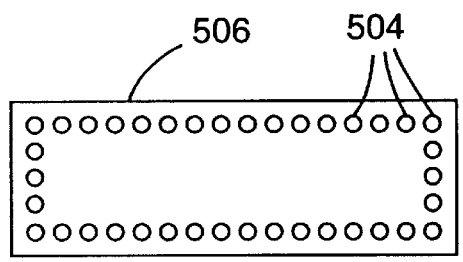

FIGS. 15a–c illustrate various representative damping element bolt configurations.

FIG. 15a illustrates a damping element 496 having an outer rigid member 490 having bolt holes 492 positioned along the ends only.

FIG. 15b illustrates a damping element having an outer rigid member 502 having bolt holes 500 along the sides only.

FIG. 15c illustrates a damping element having an outer rigid member 506 having holes 504 along the ends and sides.

FIGS. 15d–e illustrate dowel patterns for a damping element.

FIG. 15d illustrates a damping element having an outer rigid member 520 having dowel pin holes 522 in an ordered row pattern.

FIG. 15e illustrates a damping element having an outer rigid member 532 having dowel pin holes 530 in a staggered row pattern.

FIGS. 16a–c illustrate welding patterns for a damping element.

FIG. 16a illustrates a damping element having an outer rigid member 540 having continuous welded ends 542.

FIG. 16b illustrates a damping element having an outer rigid member 550 and continuous side welds 548.

FIG. 16c illustrates a damping element having an outer rigid member 556 and spot welds 554 around the ends and sides.

FIG. 17 illustrates an outer rigid member 563 having interior 562 and edges 564, 566, 568 and 570.

Figure 18:
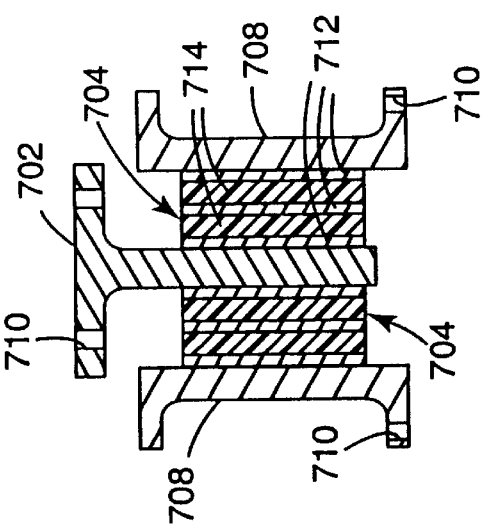
FIG. 18 illustrates an end cross-sectional view of another embodiment of a modular damper of the invention.

FIG. 18 illustrates a modular damper comprising outer structural members 708 and an inner T-shaped structural member 702, and damping elements 704 attached therebetween. Each damping element 704 comprises alternating rigid members 712 and vibration dampimg material layers 714 bonded therebetween. The damper may be connected to the structure to be damped via bolt holes 710.

Figure 19:
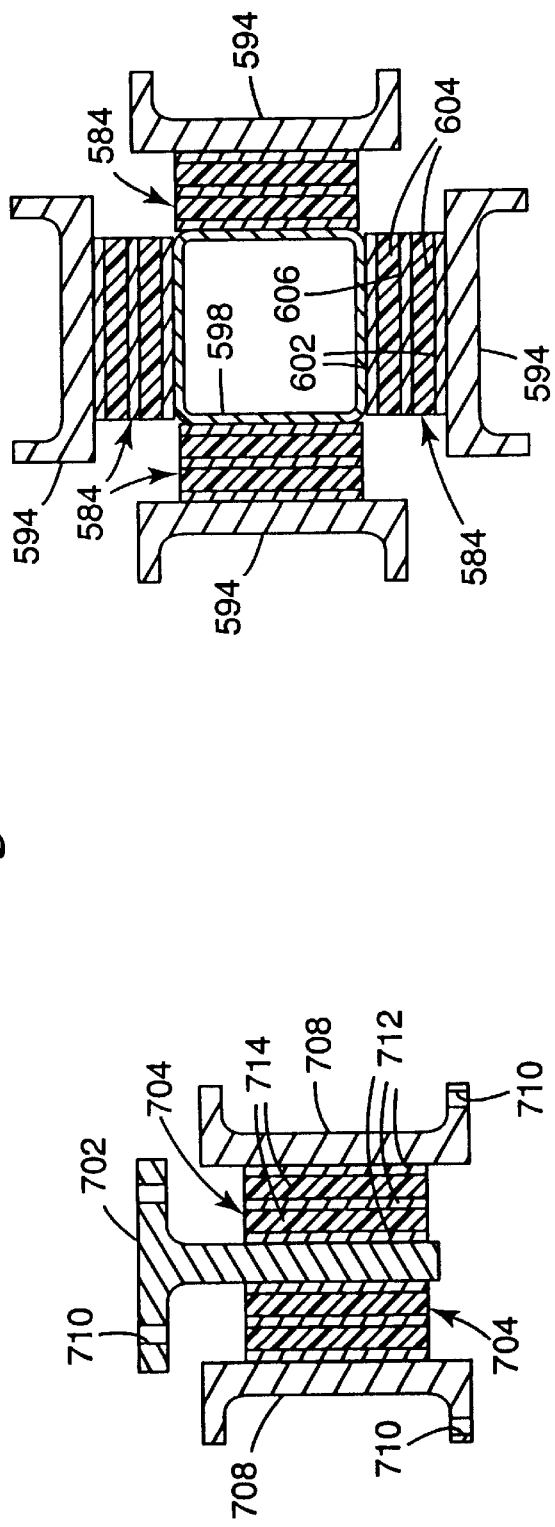
FIG. 19 illustrates an end cross-sectional view of another embodiment of a modular damper of the invention.

FIG. 19 illustrates a modular damper having a "tube" configuration comprising outer structural members 594 and inner structural member 598, and damping elements 584 attached therebetween. Damping elements 584 each comprise outer rigid members 602, inner rigid member 606 and vibration damping material layers 604 bonded therebetween.

Figure 20:
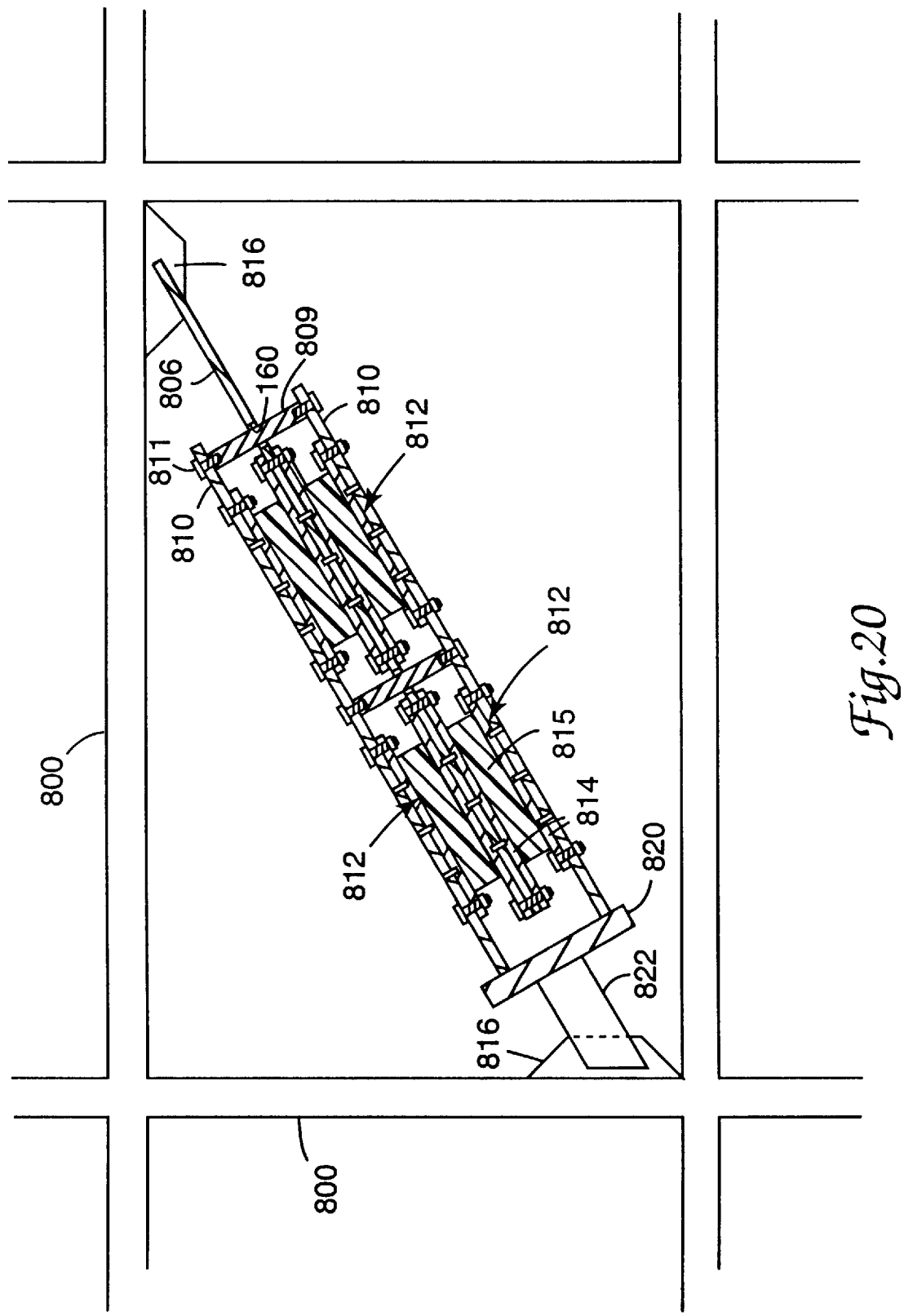
FIG. 20 illustrates a side elevational view of a building bay with a modular damper of the invention shown in section.

FIG. 20 illustrates a modular damper comprising outer structural members 810, center structural member 806 and damping modules 812 connected via bolts and dowels therebetween. Damping element 812 comprises outer rigid members 814 and vibration damping material layer 815. Support member 820 is secured between the outer structural members 810. Secondary structural member 822 secures the support member 820 to gusset 816 which is attached to beam 800. Center structural member 806 is attached to gusset 816 which is attached to beam 800. Shoulder rods 809 which pass through holes 160 in center structural member 806, connect outer structural members 810 via bolts 811.

FIG. 23a illustrates a simple buckling situation where rigid member 900 is bonded to damping layer 902. The rigid member is of length 910, width 914, and thickness 912, and is attached to the damper structural member (not shown) via bolts 906 through bolt holes 904. Distributed load 916 is applied across the shear area of the damping layer.

FIG. 23b represents a model of the situation illustrated in FIG. 23a Force P acts on simply supported rigid member 908, which is attached at ground point 910.

Figure 24:
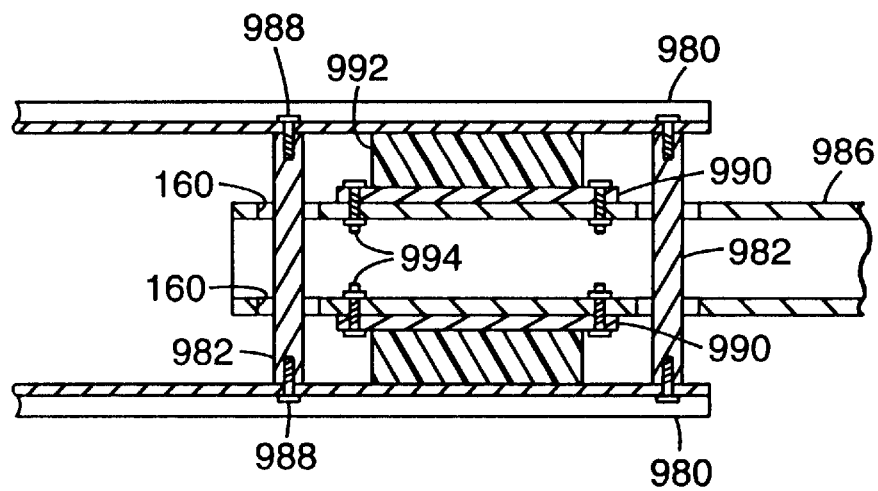
FIG. 24 illustrates a side cross-sectional view of another embodiment of a modular damper of the invention.

FIG. 24 illustrates a modular damper comprising channel beam outer structural members 980, square tube beam inner structural member 986, damping elements comprising outer rigid members 990 and outer vibration damping material layers 992, and fasteners 994 which attach the outer rigid members to the square tube beam inner structural member 986. Shoulder rods 982, which pass through holes 160 in the square tube beam inner structural member 986 connect channel beam outer structural members 980 via fasteners 988.

Figure 25:
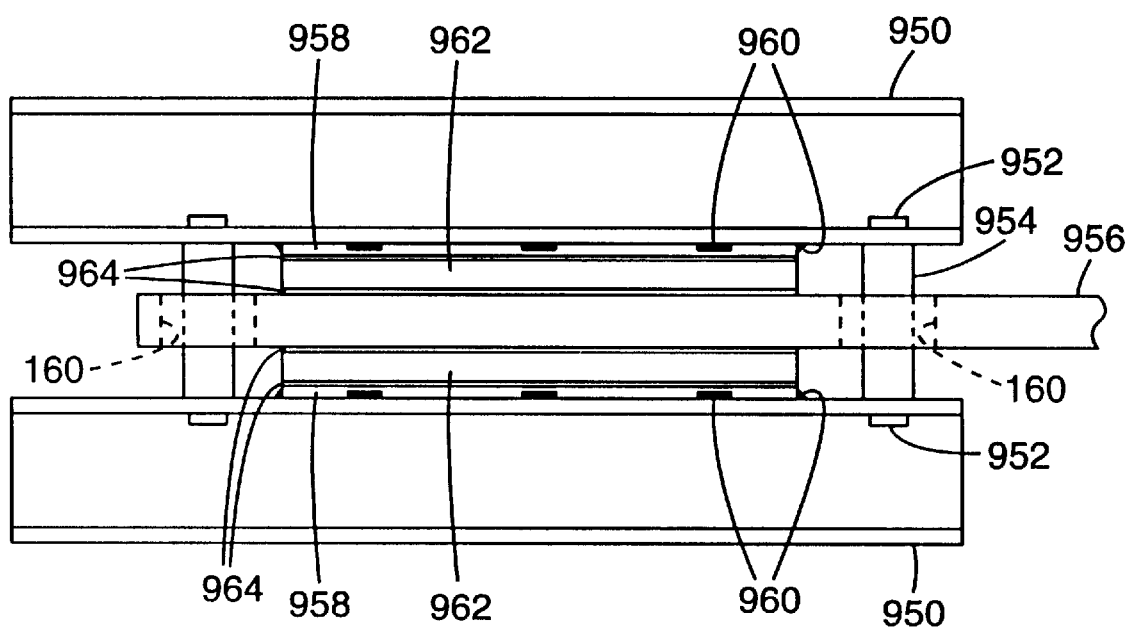
FIG. 25 illustrates a side elevational view of another embodiment of a modular damper of the invention.

FIG. 25 illustrates a modular damper of the invention comprising "I" beam outer structural members 950, inner structural member 956, damping elements comprising outer rigid members 958, vibration damping material layers 962, and adhesive layers 964. Welds 960 serve to attach the damping elements via outer rigid members 958 to outer structural members 950. Shoulder rods 954 which pass through holes 160 in inner structural member 956 connect outer structural members 950 via fasteners 952.

TEST METHOD

The following test method was utilized herein.

Dynamic Test of Damper

A modular damper of the invention was installed between the load cell and the actuator of a large dynamic test machine commercially available from MTS Systems Corporation, Eden Prairie, Minn., such that the modular damper center structural member was connected to the load cell and the damper outer structural members were connected to the actuator. The test machine had the following components: a Model 311.31 load frame, a Model 445 controller, a Model 204.41 actuator, and a Model 3317 106 load cell commercially available from Lebow Associates, Inc., Oak Park, Mich.

Using the actuator, the two outer structural members were displaced simultaneously in a sinusoidal waveform at 0.5 Hertz for 5 cycles. The displacement between the two outer rigid members of a damping element and the displacement between the central structural member and one of the outer structural members were each measured using a Model GCD-121-1000 linear variable displacement tranducer (LVDT), commercially available from Schaevitz Engineering, Pennsauken, N.J. The output signals from the load cell and the LVDTs were fed into a Nicolet Model 420 data acquisition system commercially available from Nicolet Instrument Corporation, Madison, Wis., from which force-displacement graphs were obtained.

EXAMPLE

The following Example further illustrates but does not limit the present invention. All parts, percentages, ratios, etc., in the Example and the rest of the specification are by weight unless indicated otherwise.

Example 1

Figure 26A:
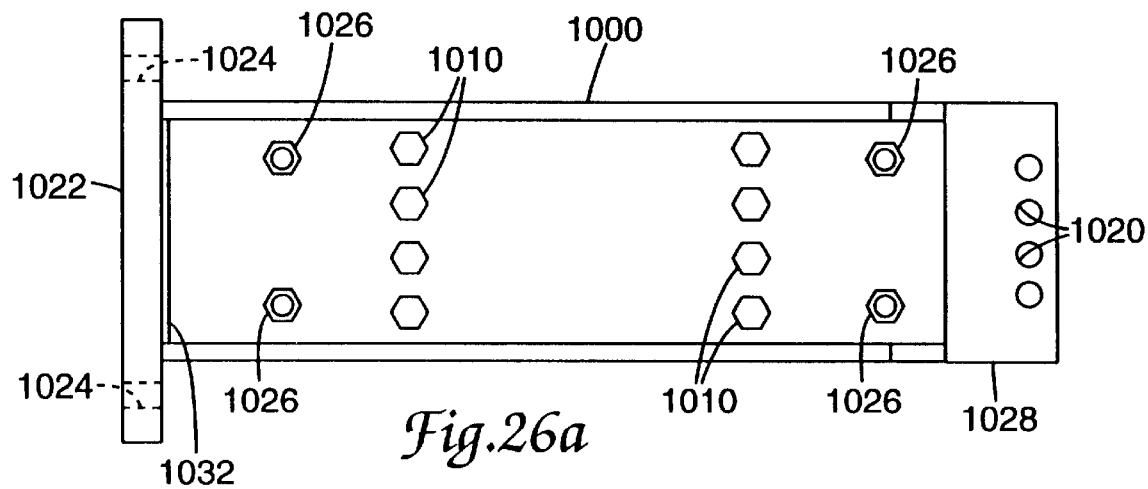
FIG. 26a illustrates a plan view of another embodiment of a modular damper of the invention.
Figure 26B:
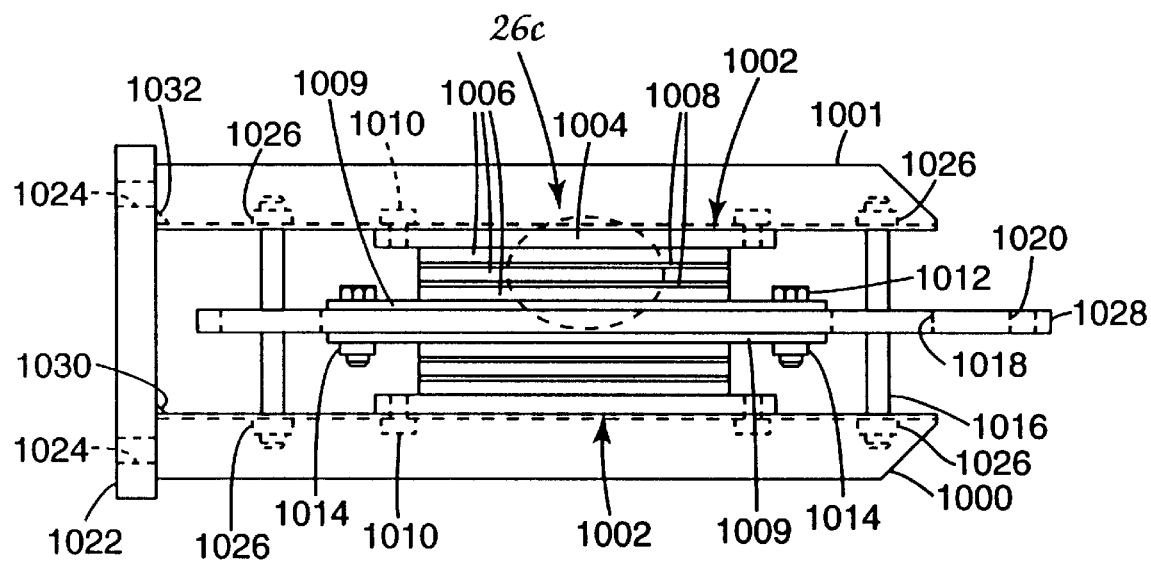
Figure 26C:
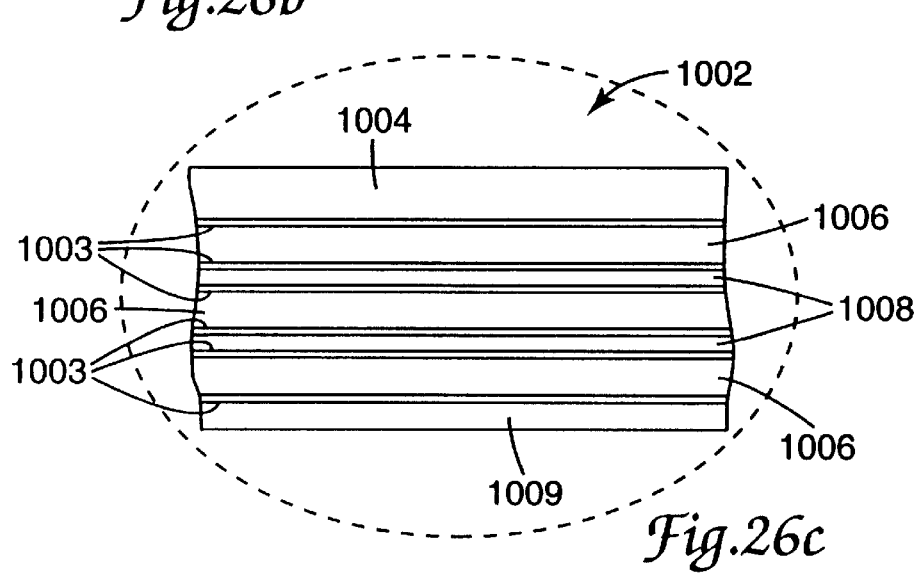

A modular damper of the present invention illustrated in FIG. 26a, FIG. 26b, and FIG. 26c was prepared as follows.

First, two damping elements 1002 were assembled, each comprising outer rigid members 1004 and 1009 and two inner rigid members 1008 layered with three damping material layers 1006 and adhesive layers 1003 between all interfaces.

The two outer rigid members 1004 and 1009 were American Iron and Steel Institute (AISI) 1020 hot rolled steel plates. The first outer rigid member plate 1009 was 24.00 inches (610 mm) long by 12.00 inches (305 mm) wide by 0.470 inches (11.9 mm) thick. On each end, four 1 1/16 inch (27 mm) diameter bolt holes were drilled equally spaced 3 inches (76.2 mm) apart in a row parallel with the widthwise edge of the plate. The first of these holes was located a distance of 1.50 inches (38.1 mm) from the lengthwise edge and 1.50 inches (38.1 mm) from the widthwise edge. The second outer rigid member plate 1004 was 19.50 inches (495 mm) long by 12.00 inches (305 mm) wide by 0.970 inches (24.6 mm) thick. On each end of 1004, four 7/8 inch (22.2 mm) diameter threaded bolt holes were drilled equally spaced 2.62 inches (66.5 mm) apart in a row parallel with the widthwise edges of the plate and tapped at 8 threads per inch. The first of these holes was located at a distance of 2.07 inches (52.6 mm) from the lengthwise edge and 1.50 inches (38.1 mm) from the widthwise edge. The major surface of one side of each rigid member was ground flat to 0.005 inch (0.127 mm) and had a measured roughness of 63 micro-inches ($2.5 \times 10^{-3}$ mm). Outer rigid members of different dimensions were used so that rigid member 1009 would extend beyond the other rigid member 1004 to bolting to the damper structural members 1000, 1001, and 1028. The flat, smooth surface of the outer plates 1004 and 1009 were cleaned with a commercially available degreasing solution and abraded to expose a metal surface ready for bonding.

The two inner rigid members 1008 were 12 inches (305 mm) wide by 15 inches (381 mm) long by 1/8 inch (3.2 mm) thick AISI 1020 hot rolled steel plates. The major surface of each side of each rigid member was ground flat to 0.005 inch (0.127 mm) and had a measured roughness finish of 63 micro-inches ($2.5 \times 10^{-3}$ mm). The flat, smooth surfaces of the rigid members were cleaned with a commercially available degreasing solution and abraded before bonding.

Each of the three vibration damping material layers 1006 were 0.53 inches (13.5 mm) thick by 12 inches (305 mm) wide by 15 inches (381 mm) long. The damping material used was Scotchdamp™ SJ 2015X type 109, available from Minnesota Mining and Manufacturing Co., St. Paul, Minn. Each major surface of the viscoelastic damping material was textured with an abrasive pad prior to bonding.

A two-part epoxy adhesive, Scotch-Weld™ Adhesive DP-460, commercially available from Minnesota Mining and Manufacturing Co., St. Paul, Minn., was mixed and applied to the clean, abraded surface of the first metal plate 1009 and to one of the prepared surfaces of the vibration damping material layer 1006. The adhesive coated surface of the damping layer was mated to the adhesive coated surface of the metal plate to form adhesive layer 1003. Care was taken to prevent air entrapment in the adhesive layer. In similar fashion, the remaining bonds were formed between the remaining damping element layers, adding each layer to the laminate until the second outer rigid member plate 1004 was applied. Care was taken not to exceed the work life of the epoxy during this process. The completed laminate containing layers as illustrated in FIG. 26c was placed in a fixture to maintain proper alignment of the various layers during the epoxy cure. The damping element was then pressed to about 5 psi ($3.5 \times 10^4$ Pascals) for two hours at about 72° F. (22° C.) and 40% relative humidity. A press stop located at each end between the extended outer rigid members 1004 and 1009 was set such that the total thickness of the damping element 1002 was 3.37 inches (85.6 mm).

Each of the outer structural members 1000 and 1001 was an AISI 1020 hot rolled steel 20.7 lbs/ft (30.9 kg/m) structural channel beam 12 inches (305 mm) wide by 37.62 (966 mm) long. A 45° angle was cut in one end of each of these outer structural members 1000 and 1001 as illustrated in FIG. 26b. Four rows of holes were drilled in rows parallel to the widthwise edge of structural members 1000 and 1001 to accommodate attachment bolts 1010 and shoulder screw 1016. The first row of shoulder screw holes was located 3.00 inches (76.2 mm) from the angled end of the channel. These two 13/16 inch (20.6 mm) diameter holes were placed 7 inches (179 mm) apart, beginning 2.50 inches (63.5 mm) in from the lengthwise edge on both parts. The second row of shoulder screw holes was located 32.12 inches (816 mm) from the angled end of 1000 and 1001, with the two holes spaced 7 inches (179 mm) apart and 2.5 inches (63.5 mm) in from each lengthwise edge. Additionally, a row of bolt holes was placed both at 7.06 inches (179 mm) and at 28.06 inches (713 mm) from the angled end of 1000 and 1001 to accommodate bolts 1010. Each of these rows included four 1 1/16 inch (27.0 mm) diameter holes equally spaced 2.26 inches (66.5 mm) apart and beginning 2.07 inches (52.6 mm) in from the lengthwise edge in both parts.

The center structural member 1028 was an AISI 1020 hot rolled 12 inch (305 mm) wide by 38.38 inch (975 mm) long by 1 inch (25.4 mm) thick plate with the same bolt holes as the first outer rigid member 1009 described herein above. Additionally, a row of four equally spaced 1 1/16 inch (27.0 mm) diameter test equipment load cell attachment holes 1020 were drilled on one end of 1028. These holes were spaced 3 inches (76.2 mm) apart, beginning at a location 1.37 inches (34.8 mm) in from one widthwise edge and 1.50 inches (38.1 mm) from the lengthwise edge. The center structural member 1028 also had four slots 1018 running parallel to the lengthwise edges, measuring 1.03 inches (26.2 mm) wide by 5.03 inches (128 mm) long with a 0.52 inch (13.2 mm) radius on each end. These slots 1018 allow the shoulder screws 1016 to move with respect to 1028 during operation of the damper. Two of these slots 1018 were centered 7 inches (178 mm) apart, beginning 2.50 inches (63.5 mm) in from the lengthwise edge of 1028 and 3.5 inches (88.9 mm) in from the widthwise edge opposite the row of load cell attachment holes 1020. The other two slots 1018 were similarly spaced 7 inches (178 mm) apart and centered beginning 29.12 inches (740 mm) from the center of the first set of slots 1018 and 2.50 inches (63.5 mm) in from the lengthwise edge of structural member 1028.

Four 1 inch (25.4) diameter shoulder screws 1016 were fabricated from AISI 1018 cold rolled steel. The overall length of each screw was 10.23 inches (260 mm) and the distance between the shoulder surfaces was 7.74 inches (197 mm). Both ends of shoulder screw 1016 were threaded at 3/4 inch (19.1 mm) diameter and 10 threads per inch for a distance of 1.26 inches (32.0 mm) from the end of the screw.

The damper was assembled in the following manner. One end of a 20.00 inch (508 mm) by 15.50 inch (394 mm) by 2 inch (51 mm) thick steel plate 1022 was attached via weld 1030 to the non-angled end of outer structural member 1000 to provide a flange for attaching the damper to the test machine actuator. Four holes 1024 were drilled in this flange plate, each located at a corner of the plate 2.25 inches (57.2 mm) in from each edge. The flange 1022 and structural member 1000 were positioned such that the flat side of 1000 was 4.00 inches (102 mm) away from the 20.00 inch (508 mm) edge of the flange and centered across the length of that edge.

The first damping element 1002 was placed on the flat side of outer structural member 1000 that had been welded to the flange 1022. The bolt holes in outer rigid member 1004 of the damping element were aligned with the bolt holes in 1000. One inch (25.4 mm) diameter—8 threads/inch by 1.5 inch (38 mm) long Grade 5 plated carbon steel bolts 1010 were inserted into the drilled bolt holes in 1000, into the threaded bolt holes in 1004, and tightened with a pneumatic torque wrench. Next center structural member 1028 was placed on the damping element 1002 such that the bolt holes were in alignment. Likewise, the second damping element 1002 was placed and aligned on 1028 with 1009 of the second element 1002 placed in contact with 1028. Bolts 1012 similar to those described above but measuring 3 1/4 inches (82.6 mm) long were used to loosely engage the outer rigid members 1009 and center structural member 1028 with 1 inch (25.4 mm) hex nuts 1014. One should screw 1016, was inserted through each slot 1018 in 1028, through the shoulder screw hole in member 1000, fitted with a 3/4 inch (19.1 mm) hex nut 1026, and tightened in place with a pneumatic torque wrench. The second outer structural member 1001 was then placed on the second damping element 1002 with its flat surface in contact with 1004 of the second damping element 1002 such that all bolt holes aligned with the matching holes in the damping element 1002 and the threaded ends of the shoulder screws. Bolts 1010 and hex nuts 1026 were added and tightened with a pneumatic torque wrench. All remaining nuts 1014 were tightened. Finally, the end of the second outer structural member 1001 that was not angled was welded to flange plate 1022 via weld 1032.

Figure 21:
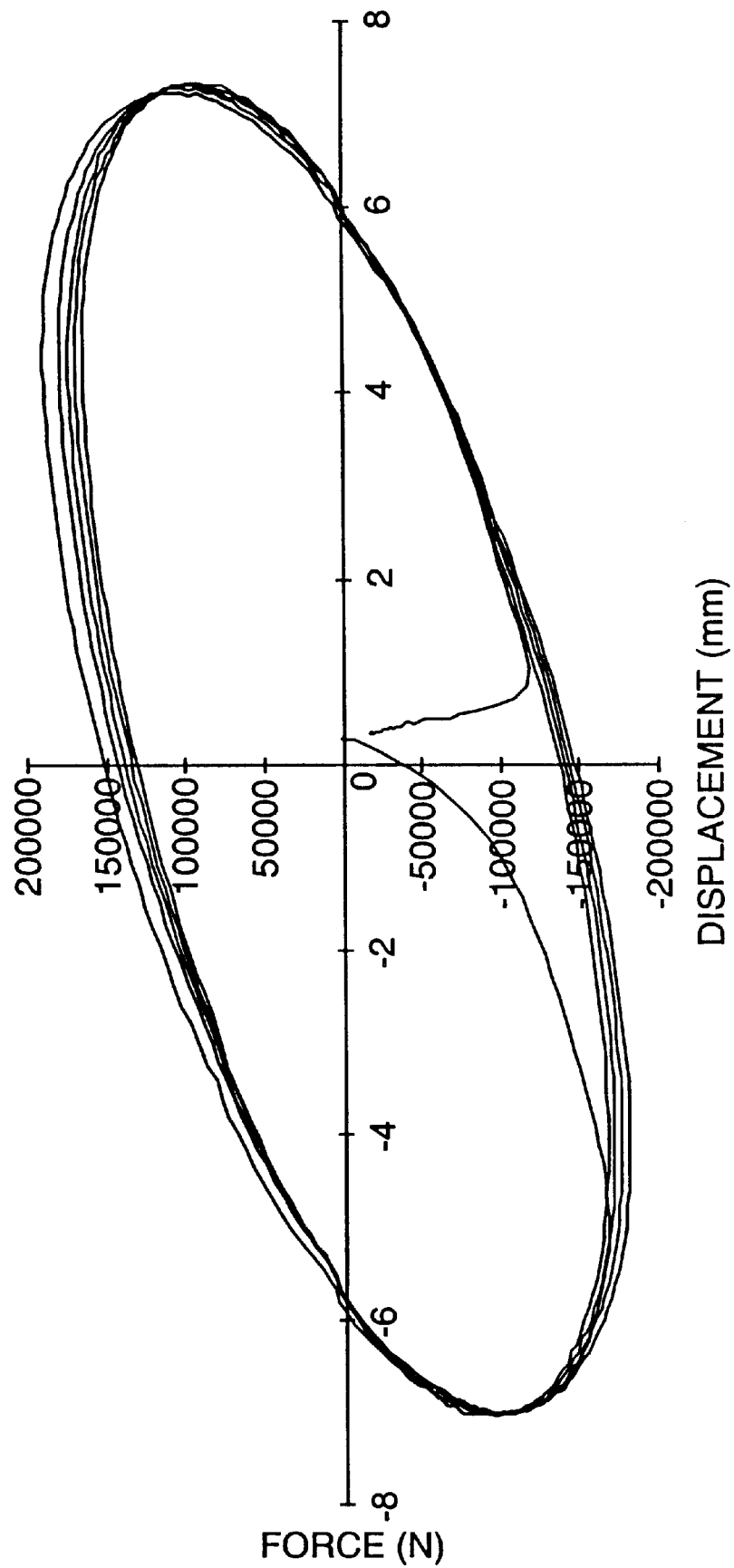
FIG. 21 illustrates the force on a modular damper of the present invention versus the displacement of one of the damping elements.
Figure 22:
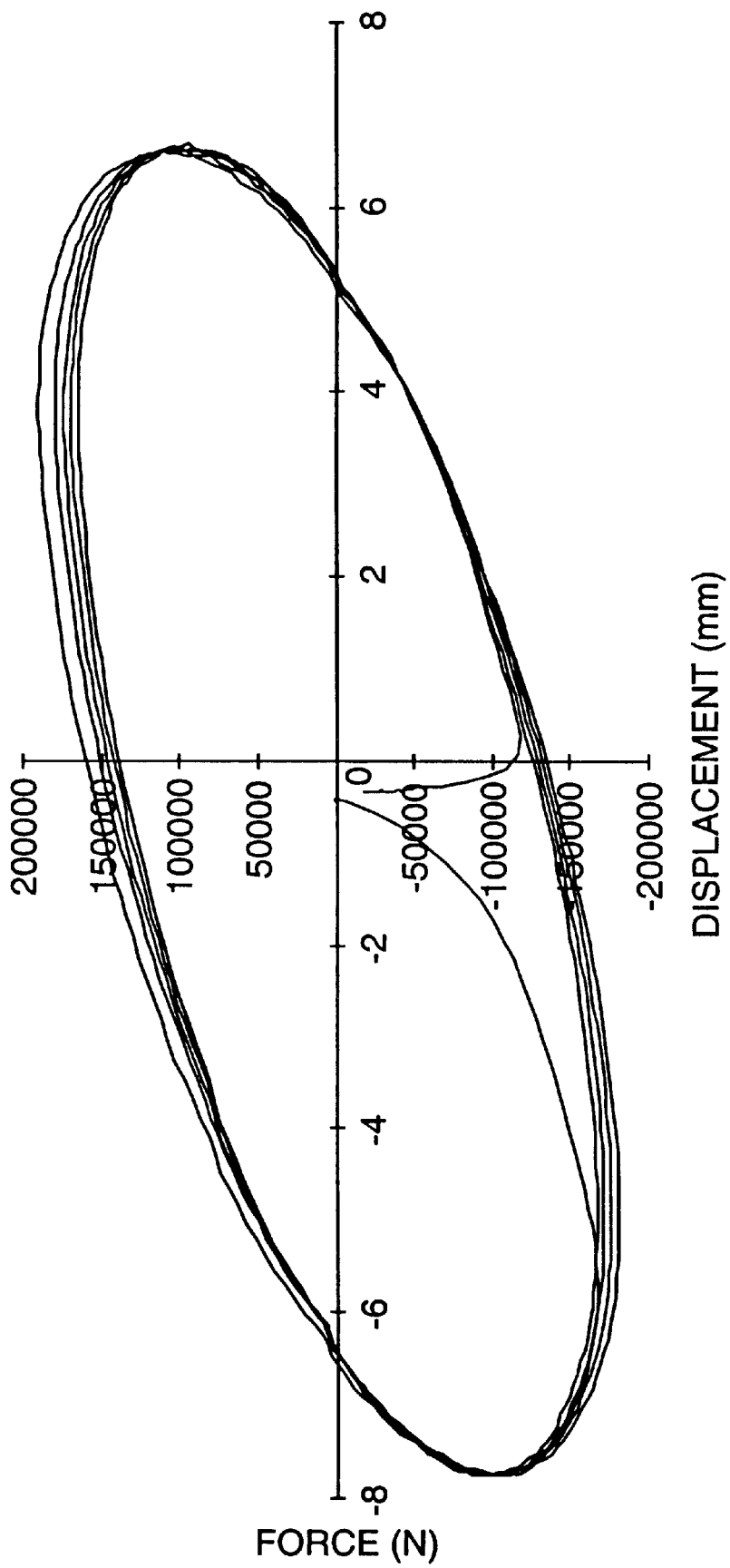
FIG. 22 illustrates the force versus displacement for a modular damper of the present invention.

The modular damper was inserted into the test equipment and tested according to the Damper Dynamic Test described hereinabove. Testing was done at 70° F. (21° C.). The maximum displacement amplitude was 0.3 inch (7.6 mm). The damper dissipated approximately 30,000 lb-inch (3,500 N-m) in each cycle. Test results are graphically illustrated in FIGS. 21 and 22. FIG. 21 represents the displacement between the two outer rigid members of one of the two damping elements versus the force in the damper. FIG. 22 represents the displacement between the center structural member and one outer structural member versus the force in the damper. The area in each elliptical loop represents the energy dissipated in one cycle of displacement. FIGS. 21 and 22 show similar force-displacement loops and energy dissipation capability. This indicates that the connection between the damper element and the damper structural members was good and no slippage occurred for this test condition.

While this invention has been described in connection with specific embodiments, it should be understood that it is capable of further modification. The claims herein are intended to cover those variations which one skilled in the art would recognize as the equivalent of what has been described herein.

It is claimed:

1. A modular damper comprising;
   two or more structural members wherein each structural member is attached to at least one damping element,
   wherein each damping element independently comprises:
   (i) two outer rigid members;
   (ii) one layer of a vibration damping material comprising a viscoelastic material having a loss factor of at least about 0.5 at 20° C. and 1 Hz between the two outer rigid members;
   wherein said outer rigid members and said structural members have shear moduli greater than the vibration damping material layer(s),
   wherein each structural member is attached to at least one other structural member via at least one damping element, and
   wherein the damping element(s) are positioned such that mechanical energy applied to the structural member(s) is at least partially dissipated by at least one damping element, wherein the modular damper is an interstructural damper that does not support the weight of a structure to be damped.

2. The modular damper of claim 1 wherein the damping element(s) are attached to the structural members via an attachment means selected from the group consisting of bolts, dowels, welding, adhesives, and interlocking surface features.

3. The modular damper of claim 1 wherein the damping element(s) are attached to the structural members via an attachment means selected from the group consisting of bolts, dowels, welds, and combinations thereof.

4. The modular damper of claim 1 wherein the outer rigid members of each damping element are separated from the vibration damping material layers by a layer of adhesive.

5. The modular damper of claim 4 wherein the adhesive is an epoxy adhesive.

6. The modular damper of claim 1 wherein each damping element has vibration damping material layer(s) with thickness of about 1.5 mm to about 127 mm.

7. The modular damper of claim 1 wherein the structural members are selected from the group consisting of I beams, T beams, channel beams, angles, and tubes.

8. The modular damper of claim 1 wherein the structural members are flat metal plates.

9. The modular damper of claim 1 wherein the structural members are gusseted.

10. The modular damper of claim 1 wherein the rigid members of the damping element are selected from the group consisting of bars, rods, plates, I beams, T beams, channel beams, angles, and tube sections.

11. The modular damper of claim 1 wherein the rigid members of the damping element are flat metal plates.

12. The modular damper of claim 1 wherein the rigid members of the damping element are curved plates.

13. The modular damper of claim 1 wherein the structural members and outer rigid members have a shear modulus at least about 10 times greater than that of the vibration damping material layer(s).

14. The modular damper of claim 1 wherein structural members and the outer rigid members have a shear modulus at least about 100 times greater than that of the vibration damping material layer(s).

15. The modular damper of claim 1 wherein the structural members and outer rigid members have a shear modulus at least about 1000 times greater than that of the vibration damping material layer(s).

16. The modular damper of claim 1 wherein the structural members an the outer rigid members have a shear modulus at least about 10,000 times greater than that of the vibration damping material layer(s).

17. A structure having at least one modular damper of claim 1 incorporated therein.

18. The structure of claim 17 selected from the group consisting of buildings, bridges, towers, machines, equipment, floors, facades, vehicles, monuments, statues, sculptures, solar panels, telescopes, trusses, dams, and roofs.

19. The structure of claim 17 wherein the modular damper is attached via its structural members to secondary structural members of the structure, wherein the secondary structural members of the structure are also attached to primary structural members of the structure.

20. The structure of claim 17 wherein the modular damper is attached via its structural members to primary structural members of the structure.

21. A modular damper comprising:
two or more structural members and at least one first damping element; wherein each first damping element independently comprises:
  (i) one outer rigid member;
  (ii) an outer layer of vibration damping material comprising a viscoelastic material having a loss factor of at least about 0.5 at 20° C. and 1 Hz attached to the outer rigid member
wherein said outer rigid member and said structural members have shear moduli greater than the vibration damping material layer;
and wherein each structural member is attached to at least one other structural member via at least one damping element, and
wherein the damping element(s) are positioned such that mechanical energy applied to the structural member(s) is at least partially dissipated by at least one damping element wherein the modular damper is an interstructural damper that does not support the weight of a structure to be damped.

22. The modular damper of claim 21 wherein the damping element(s) are attached to the structural members via an attachment means selected from the group consisting of bolts, dowels, welding, adhesives, and interlocking surface features.

23. The modular damper of claim 21 wherein the damping element(s) are attached to the structural members via an attachment means selected from the group consisting of bolts, dowels, and welds.

24. The modular damper of claim 21 wherein the outer rigid member of each damping element is separated from the vibration damping material layer by a layer of adhesive.

25. The modular damper of claim 24 wherein the adhesive is an epoxy adhesive.

26. The modular damper of claim 21 wherein each damping element has vibration damping material layer(s) with thickness of about 1.5 mm to about 127 mm.

27. The modular damper of claim 21 wherein the structural members are selected from the group consisting of I beams, T beams, channel beams, angles, and tubes.

28. The modular damper of claim 24 wherein said outer rigid member of each damping element is separated from the vibration damping material layer by a layer of expoxy adhesive.

29. The modular damper of claim 21 wherein the structural members are gusseted.

30. The modular damper of claim 21 wherein the rigid member(s) of the damping element are selected from the group consisting of bars, rods, plates, I beams, T beams, channel beams, angles, and tube sections.

31. The modular damper of claim 21 wherein the rigid member(s) of each damping element are flat metal plates.

32. The modular damper of claim 31 wherein the rigid member(s) are curved plates.

33. The modular damper of claim 21 wherein the structural members and outer rigid member have a shear modulus at least about 10 times greater than that of the vibration damping material layer.

34. The modular damper of claim 21 wherein structural members and the outer rigid member have a shear modulus at least about 100 times greater than that of the vibration damping material layer.

35. The modular damper of claim 21 wherein the structural members and outer rigid member have a shear modulus at least about 1000 times greater than that of the vibration damping material layer.

36. The modular damper of claim 21 wherein the structural members and the outer rigid member have a shear modulus at least about 10,000 times greater than that of the vibration damping material layer.

37. A structure having at least one modular damper of claim 21 incorporated therein.

38. The structure of claim 37 selected from the group consisting of buildings, bridges, towers, machines, equipment, floors, facades, vehicles, monuments, statues, sculptures, solar panels, telescopes, trusses, dams, and roofs.

39. The structure of claim 37 wherein the modular damper is attached via its structured members to secondary structural members of the structure, wherein the secondary structural members of the structure are also attached to primary structural members of the structure.

40. The structure of claim 37 wherein the modular damper is attached via its structural members to primary structural members of the structure.

41. The modular damper of claim 1 wherein two or more damping elements are stacked upon and attached to each other.

42. The modular damper of claim 1 wherein at least one damping element further comprises one or more inner rigid members, positioned interior to the outer rigid members, wherein each rigid member in the damping element is separated from another rigid member by at least one layer of vibration damping material comprising viscoelastic material having a loss factor of at least about 0.5.

43. The modular damper of claim 1 wherein at least one damping element further comprises a layer(s) of adhesive between any of the rigid members and vibration damping material layer(s).

44. The modular damper of claim 42 wherein each damping element has 2 to 120 rigid members.

45. The modular damper of claim 42 wherein each damping element has 2 to 24 rigid members.

46. The modular damper of claim 42 wherein the inner rigid members of the damping element(s) extend beyond the vibration damping material layer(s).

47. The modular damper of claim 21 wherein at least one damping element further comprises one or more inner rigid members positioned between the outer rigid member and the outer layer of vibration damping material wherein each rigid member in the first damping element is separated from another rigid member by at least one layer of vibration damping material comprising viscoelastic material having a loss factor of at least about 0.5.

48. The modular damper of claim 21 wherein at least one damping element further comprises a layer(s) of adhesive between any of the rigid member(s) and vibration damping material layer(s).

49. The modular damper of claim 21 which further comprises sit least one second damping element, wherein each second damping element independently comprises:

(i) two outer rigid members;

(ii) at least one layer of a vibration damping material between the two outer rigid members.

50. The modular damper of claim 21 wherein two or more damping elements are stacked upon and attached to each other.

51. The modular damper of claim 47 wherein each damping element has 1 to 120 rigid members.

52. The modular damper of claim 47 wherein each damping element has 1 to 24 rigid members.

53. The modular damper of claim 47 wherein the inner rigid member(s) of each damping element extend beyond the vibration damping material layer(s).

\* \* \* \* \*

UNITED STATES PATENT AND TRADEMARK OFFICE
CERTIFICATE OF CORRECTION

PATENT NO. : 5,946,866
DATED : September 7, 1999
INVENTOR(S) : James T. Weglewski and Ming-Lai Lai It is certified that error appears in the above-identified patent and that said Letters Patent is hereby corrected as shown below:

Column 31, line 63, "element wherein" should read --element, wherein--;

Column 32, lines 34, 38, 42, and 46, "member" should read --member(s)--;

Column 32, lines 36, 40, 44, and 48, "layer" should read --layer(s)--;

Column 32, line 21, "expoxy" should read --epoxy--;

Column 34, line 6, "sit" should read --at--; and

Column 34, line 23, the following claim should be added --54. The modular damper of claim 21 wherein the structural members are flat metal plates.--

Signed and Sealed this

Thirteenth Day of June, 2000

Attest:

Q. TODD DICKINSON

*Attesting Officer*   *Director of Patents and Trademarks*